US012756005B2

(12) United States Patent

Kim et al.

(10) Patent No.: US 12,756,005 B2

(45) **Date of Patent: *Oct. 6, 2026**

(54) SOLID ELECTROLYTE INCLUDING NITROGEN AND SULFUR, ELECTROCHEMICAL CELL INCLUDING SOLID ELECTROLYTE, AND METHOD OF PREPARING SOLD ELECTROLYTE

(71) Applicant: Samsung SDI Co., Ltd., Yongin-si (KR)

(72) Inventors: Soyeon Kim, Suwon-si (KR); Hyunseok Kim, Suwon-si (KR); Seoksoo Lee, Yongin-si (KR)

(73) Assignee: SAMSUNG SDI CO., LTD., Gyeonggi-Do (KR)

( * ) Notice: Subject to any disclaimer, the term of this patent is extended or adjusted under 35 U.S.C. 154(b) by 226 days.

This patent is subject to a terminal disclaimer.

(21) Appl. No.: 18/407,616

(22) Filed: Jan. 9, 2024

(65) Prior Publication Data

US 2024/0194938 A1 Jun. 13, 2024

Related U.S. Application Data

(63) Continuation of application No. 16/993,760, filed on Aug. 14, 2020, now Pat. No. 11,908,994.

(30) Foreign Application Priority Data

Nov. 7, 2019 (KR) ........................ 10-2019-0141899
Aug. 3, 2020 (KR) ........................ 10-2020-0096951

(51) Int. Cl.

| | |
|---|---|
| ***H01M 10/0562*** | (2010.01) |
| ***H01M 4/131*** | (2010.01) |

(Continued)

(52) U.S. Cl.

CPC ....... *H01M 10/0562* (2013.01); *H01M 4/131* (2013.01); *H01M 4/134* (2013.01);

(Continued)

(58) Field of Classification Search

CPC ................................................ H01M 10/0562

(Continued)

(56) References Cited

U.S. PATENT DOCUMENTS

| | | | |
|---|---|---|---|
| 6,402,795 | B1 | 6/2002 | Chu et al. |
| 7,993,782 | B2 | 8/2011 | Takada et al. |

(Continued)

FOREIGN PATENT DOCUMENTS

| | | |
|---|---|---|
| CN | 107112586 A | 8/2017 |
| CN | 108899580 A | 11/2018 |

(Continued)

OTHER PUBLICATIONS

Office Action dated Feb. 13, 2025, issued in corresponding CN Patent Application No. 202010829830.0, 8 pp.

(Continued)

*Primary Examiner* — Sean P Cullen

(74) *Attorney, Agent, or Firm* — CANTOR COLBURN LLP

(57) ABSTRACT

A solid electrolyte including a compound represented by Formula 1:

Formula 1

$$(Li_{1-a}M_a)_{7-d+x}PS_{6-d-x+k}N_xX_d$$

wherein, in Formula 1,

M is Na, K, Ca, Fe, Mg, Ag, Cu, Zr, Zn, or a combination thereof;

(Continued)

X is Cl, Br, F, I, a pseudohalogen, or a combination thereof; and

0<x<1, 0≤a<1, 0<d≤1.8, and 0≤k<1, and wherein the compound has an argyrodite crystal structure.

20 Claims, 8 Drawing Sheets

(51) Int. Cl.

| | |
|---|---|
| ***H01M 4/134*** | (2010.01) |
| ***H01M 4/38*** | (2006.01) |
| ***H01M 4/40*** | (2006.01) |
| ***H01M 4/62*** | (2006.01) |
| ***H01M 10/0525*** | (2010.01) |

(52) U.S. Cl.

CPC ........... *H01M 4/382* (2013.01); *H01M 4/405* (2013.01); *H01M 4/62* (2013.01); *H01M 10/0525* (2013.01); *H01M 2300/0071* (2013.01)

(58) Field of Classification Search

USPC ................................ 429/318, 304, 322, 323

See application file for complete search history.

(56) References Cited

U.S. PATENT DOCUMENTS

| | | | | |
|---|---|---|---|---|
| 8,075,865 | B2 | 12/2011 | Deiseroth et al. | |
| 9,214,674 | B2 | 12/2015 | Yoshida | |
| 9,634,358 | B2 | 4/2017 | Matsushita | |
| 9,812,734 | B2 | 11/2017 | Miyashita et al. | |
| 9,899,701 | B2 | 2/2018 | Miyashita et al. | |
| 9,899,702 | B2 | 2/2018 | Miyashita et al. | |
| 10,168,389 | B2 | 1/2019 | Fujiki et al. | |
| 10,340,506 | B2 | 7/2019 | Aihara et al. | |
| 11,908,994 | B2 * | 2/2024 | Kim ...................... | H01M 4/405 |
| 2014/0093786 | A1 | 4/2014 | Ito et al. | |
| 2015/0147660 | A1 | 5/2015 | Fujiki et al. | |
| 2016/0043430 | A1 | 2/2016 | Lee et al. | |
| 2016/0248120 | A1 | 8/2016 | Yamada et al. | |
| 2017/0149086 | A1 | 5/2017 | Du et al. | |
| 2017/0187066 | A1 | 6/2017 | Tsujimura et al. | |
| 2017/0352916 | A1 | 12/2017 | Miyashita et al. | |
| 2018/0269527 | A1 | 9/2018 | Minami | |
| 2018/0277891 | A1 | 9/2018 | Mimura et al. | |
| 2018/0287204 | A1 | 10/2018 | Kanno et al. | |
| 2019/0140313 | A1 | 5/2019 | Terai et al. | |
| 2019/0148769 | A1 | 5/2019 | Aihara et al. | |
| 2019/0198870 | A1 | 6/2019 | Watano et al. | |
| 2019/0198917 | A1 | 6/2019 | Seong et al. | |
| 2019/0260065 | A1 | 8/2019 | Nobuyoshi et al. | |
| 2020/0127325 | A1 | 4/2020 | Takahashi et al. | |
| 2021/0075058 | A1 | 3/2021 | Nakayama et al. | |
| 2021/0091409 | A1 | 3/2021 | Mimura et al. | |
| 2021/0280904 | A1 | 9/2021 | Seong et al. | |

FOREIGN PATENT DOCUMENTS

| | | | |
|---|---|---|---|
| CN | 109638347 | A | 4/2019 |
| CN | 109970083 | A | 7/2019 |
| EP | 3407412 | A1 | 11/2018 |
| KR | 1020160064942 | A | 6/2016 |
| KR | 1020170077014 | A | 7/2017 |
| KR | 20180083946 | A | 7/2018 |
| KR | 101952196 | B1 | 2/2019 |
| KR | 20190079135 | A | 7/2019 |
| WO | 2018038037 | A1 | 3/2018 |
| WO | 2018047565 | A1 | 3/2018 |
| WO | 2018139868 | A1 | 8/2018 |
| WO | 2019009228 | A1 | 1/2019 |
| WO | 2019131725 | A1 | 7/2019 |

OTHER PUBLICATIONS

European Communication pursuant to Article 94(3) EPC dated Mar. 12, 2024.

Heng Wang, "A lithium argyrodite Li6PS5Cl0.5Br0.5 electrolyte with improved bulk and interfacial conductivity", Journal of Power Sources, 412, 2019, pp. 29-36.

Akihiro Fukushima et al., "Mechanochemical synthesis of high lithium ion conducting solid electrolytes in a Li2S—P2S5—Li3N system," Solid State Ionics, 2017, vol. 304, pp. 85-89.

Extended European Search Report mailed Jan. 15, 2021 of EP Patent Application No. 20189430.0.

Office Action issued May 20, 2025, in corresponding KR Patent Application No. 10-2020-0096951, 11 pp.

Yizhou Zhu et al., "Origin of Outstanding Stability in the Lithium Solid Electrolyte Materials: Insights from Thermodynamic Analyses Based on First-Principles Calculations," Applied Materials & Interfaces, Oct. 6, 2015, vol. 7, pp. 23685-23693.

* cited by examiner

SOLID ELECTROLYTE INCLUDING NITROGEN AND SULFUR, ELECTROCHEMICAL CELL INCLUDING SOLID ELECTROLYTE, AND METHOD OF PREPARING SOLD ELECTROLYTE

CROSS-REFERENCE TO RELATED APPLICATION

This application is a continuation application of U.S. patent application Ser. No. 16/993,760, filed on Aug. 14, 2023, now U.S. Pat. No. 11,908,994, which claims priority to and the benefit of Korean Patent Application No. 10-2019-0141899, filed on Nov. 7, 2019, and Korean Patent Application No. 10-2020-0096951, filed on Aug. 3, 2020, in the Korean Intellectual Property Office, and all the benefits accruing therefrom under 35 U.S.C. § 119, the contents of which are incorporated herein in its entirety by reference.

BACKGROUND

1. Field

The present disclosure relates to a solid electrolyte, an electrochemical cell including the solid electrolyte, and a method of preparing the solid electrolyte.

2. Description of Related Art

Recently, development of a battery having high specific energy and increased safety has been actively carried out in accordance with industrial requirements. For example, lithium-ion batteries have been put to practical use in the automotive field as well as in information-related equipment and communication equipment. In the field of automobiles, safety is particularly important because safety measures protect human lives.

Currently available lithium ion batteries use an electrolytic solution containing a flammable organic solvent, and thus there is a possibility of overheating and fire when a short circuit occurs. To provide improved safety, an all-solid battery using a solid electrolyte, instead of an electrolytic solution, has been proposed.

In the all-solid battery, the possibility of a fire or an explosion, even when a short circuit occurs, may be greatly reduced by not using a flammable organic solvent. Therefore, an all-solid battery may be safer than a lithium-ion battery using a liquid electrolyte.

A sulfide-based solid electrolyte having an excellent ion conductivity is used as a solid electrolyte of an all-solid battery. However, the sulfide-based solid electrolyte has a weak stability towards oxidation at a high voltage, and thus there remains a need for an improved electrolyte.

SUMMARY

Provided is a solid electrolyte including nitrogen.

Provided is an electrochemical cell having improved rate capability and lifetime characteristics by including the solid electrolyte.

Provided is a method of preparing the solid electrolyte.

Additional aspects will be set forth in part in the description which follows and, in part, will be apparent from the description.

According to an aspect, a solid electrolyte includes a compound represented by Formula 1:

Formula 1

$$(Li_{1-a}M_a)_{7-d+x}PS_{6-d+k}N_xX_d$$

wherein, in Formula 1,

M is Na, K, Ca, Fe, Mg, Ag, Cu, Zr, Zn, or a combination thereof;

X is Cl, Br, F, I, a pseudohalogen, or a combination thereof; and $0<x<1$, $0\leq a<1$, $0<d\leq 1.8$, and $0\leq k<1$, and wherein the compound of Formula 1 has an argyrodite crystal structure.

According to an aspect, an electrochemical cell includes a cathode layer; an anode layer; and a solid electrolyte layer disposed between the cathode layer and the anode layer, wherein at least one of the solid electrolyte layer and the cathode layer includes the solid electrolyte.

According to an aspect, a method of preparing a solid electrolyte including a compound of Formula 1 includes:

providing a Li precursor, a S precursor, a P precursor, an X precursor, a N precursor, and optionally an M precursor;

mixing the Li precursor, the S precursor, the P precursor, the X precursor, the N precursor, and the M precursor if present, to prepare a solid electrolyte precursor; and heat-treating the solid electrolyte precursor at a temperature equal to or greater than about 300° C. to prepare the solid electrolyte including the compound of Formula 1, Formula 1

$$(Li_{1-a}M_a)_{7-d+x}PS_{6-d-x+k}N_xX_d$$

wherein, in Formula 1,

M is Na, K, Ca, Fe, Mg, Ag, Cu, Zr, Zn, or a combination thereof,

X is Cl, Br, F, I, a pseudohalogen, or a combination thereof, and $0<x<1$, $0\leq a<1$, $0<d\leq 1.8$, and $0\leq k<1$, wherein the compound of Formula 1 has an argyrodite crystal structure.

According to an aspect, in the method of preparing the solid electrolyte, X in the X precursor is Cl, Br, F, I, a pseudohalogen, or a combination thereof.

The precursor mixture may further include an M precursor, wherein M of the M precursor is Na, K, Ca, Fe, Mg, Ag, Cu, Zr, Zn, or a combination thereof.

According to an aspect, a solid electrolyte includes a compound represented by Formula 1:

Formula 1

$$(Li_{1-a}M_a)_{7-d+x}PS_{6-d-x+k}N_xX_d$$

wherein, in Formula 1,

M is Na or K, or a combination thereof;

X is Cl, Br, F, I, a pseudohalogen, or a combination thereof; and $0<x<1$, $0\leq a<1$, $0<d\leq 1.8$, and $0\leq k<1$, and wherein the compound has an argyrodite crystal structure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
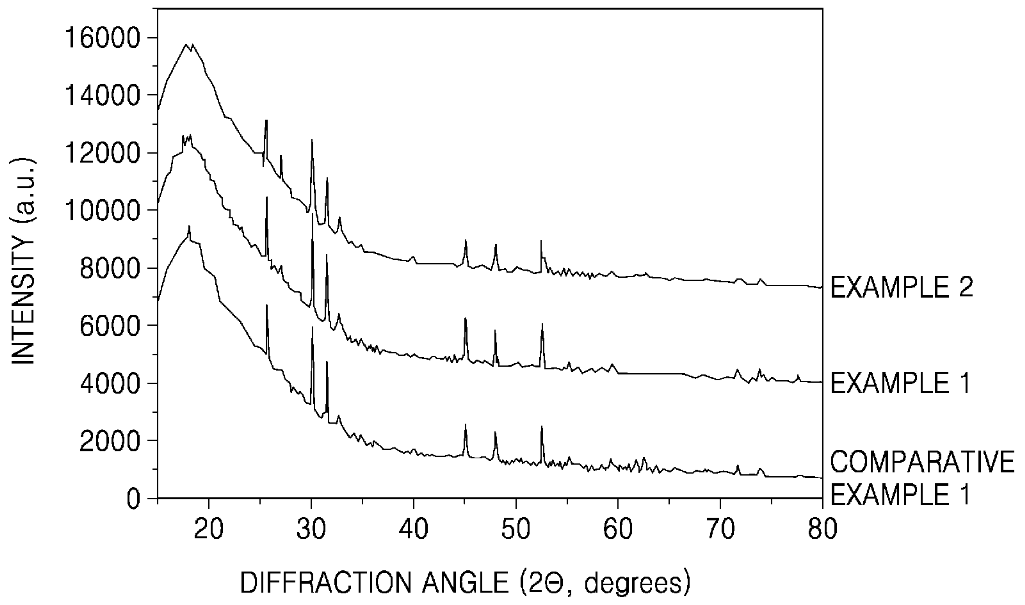
FIG. 1 is a graph of intensity (arbitrary units (a.u.)) versus diffraction angle (°2θ) and shows the results of X-ray diffraction (XRD) analysis of solid electrolytes prepared in Examples 1 and 2 and Comparative Example 1, when analyzed by X-ray diffraction (XRD) using Cu Kα radiation.
Figure 2:
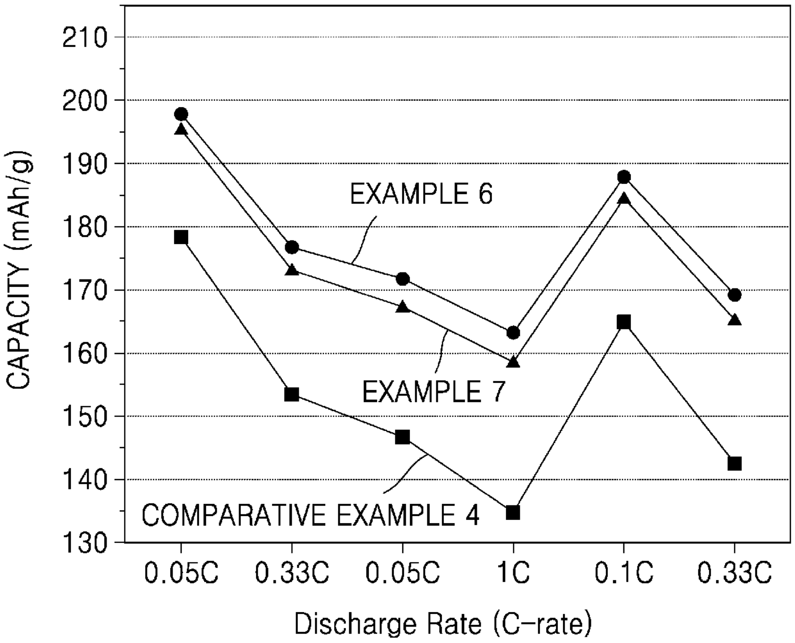
FIG. 2 is a graph of capacity (milliampere hours per gram (mAh/g)) versus discharge rate (C-rate) and illustrates capacity of all-solid secondary batteries of Examples 6 and 7 and an all-solid secondary battery of Comparative Example 4.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "At least one" is not to be construed as limiting "a" or "an." "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A C-rate describes a discharge rate of a cell, and is obtained by dividing a total capacity of the cell by a total discharge period of time of 1 hour, e.g., a C-rate for a battery having a discharge capacity of 1.6 ampere-hours would be 1.6 amperes.

As used herein, “argyrodite structure” or “argyrodite crystal structure” means that the compound has a structure that is isostructural with argyrodite, $Ag_8GeS_6$.

As used herein, the term “pseudohalogen” refers to a molecule including two or more electronegative atoms, which in the free state show properties similar to halogens. The pseudohalogen generates anions which resemble halide ions. Examples of the pseudohalogen may include cyanide (CN), cyanate (OCN), thiocyanate (SCN), azide ($N_3^-$), or a combination thereof.

A solid electrolyte, an electrochemical cell including the solid electrolyte; and a method of preparing the solid electrolyte will be described in detail.

According to an embodiment, provided is a solid electrolyte including a compound represented by Formula 1:

Formula 1

$$(Li_{1-a}M_a)_{7-d+x}PS_{6-d-x+k}N_xX_d$$

wherein, in Formula 1,

M is sodium (Na), potassium (K), calcium (Ca), iron (Fe), magnesium (Mg), silver (Ag), copper (Cu), zirconium (Zr), zinc (Zn), or a combination thereof;

X is chlorine (Cl), bromine (Br), fluorine (F), iodine (1), a pseudohalogen, or a combination thereof; and $$0 < x < 1,\ 0 \le a < 1,\ 0 < d \le 1.8, \text{ and } 0 \le k < 1,$$

wherein the compound of Formula 1 has an argyrodite crystal structure.

In Formula 1, when M is a monovalent element such as sodium (Na), potassium (K), or silver (Ag), k=0; and when M is a divalent, trivalent, or tetravalent element such as calcium (Ca), iron (Fe), magnesium (Mg), copper (Cu), zirconium (Zr), or zinc (Zn), 0<k<1. Here, the value of k is determined so that the compound of Formula 1 is electrically neutral.

In an aspect, the compound of Formula 1, wherein k=0, may be a compound represented by Formula 1-1:

Formula 1-1

$$(Li_{1-a}M_a)_{7-d+x}PS_{6-d-x}N_xX_d$$

wherein, in Formula 1-1,

M is sodium (Na), potassium (K), calcium (Ca), iron (Fe), magnesium (Mg), silver (Ag), copper (Cu), zirconium (Zr), zinc (Zn), or a combination thereof;

X is chlorine (Cl), bromine (Br), fluorine (F), iodine (I), a pseudohalogen, or a combination thereof; and $$0 < x < 1,\ 0 \le a < 1, \text{ and } 0 < d \le 1.8.$$

In an aspect, M is sodium (Na), potassium (K), or a combination thereof.

An amount of nitrogen in the solid electrolyte may be in a range of greater than 0 mole percent (mol %) to about 10 mol %, for example, greater than 0 mol % to about 5 mol %, or, for example, about 1 mol % to about 5 mol %, based on the total amount of sulfur and nitrogen in the solid electrolyte.

In an aspect, in Formulae 1 and 1-1, $0<x\le0.5$.

In an aspect, in Formulae 1 and 1-1, $0<d\le1$.

In an aspect, X of Formula 1 is Cl.

In an aspect, X is Cl and optionally at least one of F, Br, or I.

In Formulae 1 and 1-1, $X_d$ may be $Cl_d$, $Br_d$, or $(Br_{1-x2}Cl_{x2})_d$, wherein $0<x2<1$ and $0<d\le1$.

While not wanting to be bound by theory, it is understood that lithium mobility is increased by introducing an element having large atomic size into a sulfur (S) site to increase an ion conductivity of a sulfide-based solid electrolyte having an argyrodite crystal structure. The sulfide-based solid electrolyte has weak oxidation stability, at a high voltage during charge, may form a resistance layer due to a reaction at an interface of the solid electrolyte and a cathode layer. The interface may result in an undesired increase in internal resistance, and thus improvement to avoid the increased resistance is desired.

When nitrogen is added to the solid electrolyte having an argyrodite crystal structure, ion conductivity is expected to be low due to reduced lithium pores and a decreased lattice volume, and thus studies thereon have not substantially been conducted.

However, it has been unexpectedly discovered that a solid electrolyte that has an argyrodite crystal structure that includes nitrogen (N) exhibits a stabilized interface due to a decrease in the presence of a resistance layer, which is understood to be caused by a reaction at an interface between a cathode and an electrolyte. The disclosed solid electrolyte has an argyrodite crystal structure and includes nitrogen (N), and has excellent ion conductivity at an equal level of an ion conductivity of lithium of prior art sulfide-based electrolytes having an argyrodite crystal structure, despite an increase in an amount of lithium due to the inclusion of nitrogen. The disclosed solid electrolyte provides improved stability at a high voltage. The improved stability is understood to result from decreased side reaction at an interface between the cathode layer and the electrolyte, which increases a discharge capacity, and thus an electrochemical cell having improved capacity retention and charge/discharge characteristics may be provided.

In an aspect, the argyrodite solid electrolyte may be, for example, a compound of Formula 1, wherein k=0 and a=0, represented by Formula 2:

Formula 2

$$Li_{7-d+x}PS_{6-d-x}N_xX_d$$

wherein, in Formula 2, X is chlorine (Cl), bromine (Br), iodine (I), or a combination thereof; and $0<x<1$ and $0<d\le1$.

In Formula 2, $0<x\le0.9$, $0<x\le0.8$, $0<x\le0.6$, or $0<x\le0.5$.

In Formula 2, $X_d$ is $Cl_d$, $Br_d$, or $(Br_{1-x1}(Cl)_{x1})_d$; and $0<x1<1$ and $0<d\le1$. x1 may be, for example, in a range of about 0.1 to about 0.9, for example, about 0.2 to about 0.8, about 0.3 to about 0.7, or about 0.4 to about 0.6; or about 0.5.

In an aspect, in Formula 1, M may be Na or K, and k=0. The compound represented by Formula 1 may be, for example, a compound represented by Formula 3, Formula 4, or a combination thereof:

Formula 3

$$(Li_{1-a}Na_a)_{7-d+x}PS_{6-d-x}N_xX_d$$

wherein in Formula 3, X is chlorine (Cl), bromine (Br), fluorine (F), iodine (I), a pseudohalogen, or a combination thereof; and $0<x<1$, $0<a<1$, and $0<d\leq 1$, or Formula 4

$$(Li_{1-a}K_a)_{7-d+x}PS_{6-d-x}N_xX_d$$

wherein in Formula 4, X is chlorine (Cl), bromine (Br), fluorine (F), iodine (I), a pseudohalogen, or a combination thereof, and $0<x<1$, $0<d\leq 1$, and $0<a<1$.

In an aspect M is not present, i.e., a=0, and k=0. Also X may be a combination of Br and Cl, e.g., $Br_{1-x1}Cl_{x1}$, wherein $0<x1<1$. The compound of Formula 1 may thus be, for example, a compound represented by Formula 5:

Formula 5

$$Li_{7-d+x}PS_{6-d-x}N_x(Br_{1-x1}Cl_{x1})_d$$

wherein, in Formula 5, $0<x<1$, $0<d\leq 1$, and $0<x1<1$.

The compound represented by Formula 1 may be, for example, $Li_{6.125}PS_{4.875}N_{0.125}Cl$, $Li_{6.25}PS_{4.75}N_{0.25}Cl$, $Li_{6.5}PS_{4.5}N_{0.5}Cl$, $Li_6Na_{0.125}PS_{4.875}N_{0.125}Cl$, $Li_6Na_{0.25}PS_{4.75}N_{0.25}Cl$, $Li_6K_{0.125}PS_{4.875}N_{0.125}Cl$, $Li_6K_{0.25}PS_{4.75}N_{0.25}Cl$, $Li_{6.125}PS_{4.875}N_{0.125}Cl_{0.5}Br_{0.5}$, $Li_{6.25}PS_{4.75}N_{0.25}Cl_{0.5}Br_{0.5}$, $Li_6Na_{0.125}PS_{4.875}N_{0.125}Cl_{0.5}Br_{0.5}$, $Li_6Na_{0.25}PS_{4.75}N_{0.25}Cl_{0.5}Br_{0.5}$, $Li_6K_{0.125}PS_{4.875}N_{0.125}Cl_{0.5}Br_{0.5}$, $Li_6K_{0.25}PS_{4.75}N_{0.25}Cl_{0.5}Br_{0.5}$, $Li_{6.125}PS_{4.875}N_{0.125}Cl_{0.16}Br_{0.84}$, $Li_{6.25}PS_{4.75}N_{0.25}Cl_{0.16}Br_{0.84}$, $Li_6Na_{0.125}PS_{4.875}N_{0.125}Cl_{0.16}Br_{0.84}$, $Li_6Na_{0.25}PS_{4.75}N_{0.25}Cl_{0.16}Br_{0.84}$, $Li_6K_{0.125}PS_{4.875}N_{0.125}Cl_{0.16}Br_{0.84}$, $Li_6K_{0.25}PS_{4.75}N_{0.25}Cl_{0.16}Br_{0.84}$, $Li_{6.125}PS_{4.875}N_{0.125}Br$, $Li_{6.25}PS_{4.75}N_{0.25}Br$, $Li_6Na_{0.125}PS_{4.875}N_{0.125}Br$, $Li_6Na_{0.25}PS_{4.75}N_{0.25}Br$, $Li_6K_{0.125}PS_{4.875}N_{0.125}Br$, $Li_6K_{0.25}PS_{4.75}N_{0.25}Br$, $Li_{6.115}Cu_{0.01}PS_{4.88}N_{0.125}Cl$, $Li_{6.115}Mg_{0.01}PS_{4.88}N_{0.125}Cl$, $Li_{6.115}Ca_{0.01}PS_{4.88}N_{0.125}Cl$, $Li_{6.115}Fe_{0.01}PS_{4.88}N_{0.125}Cl$, $Li_{6.115}Zn_{0.01}PS_{4.88}N_{0.125}Cl$, $Li_{5.9}K_{0.1}Na_{0.125}PS_{4.875}N_{0.125}Cl$, or a combination thereof.

The solid electrolyte may be used as an electrolyte for an all-solid battery, e.g., between a cathode layer and an anode layer. In an aspect, the solid electrolyte may be used within the cathode layer and/or within the anode layer, e.g., as a cathode layer electrolyte material for an all-solid battery. In an aspect, the battery is a lithium-sulfur battery. Mentioned is an aspect where the solid electrolyte may be used as a cathode layer and/or an electrolyte of a lithium-sulfur battery.

The solid electrolyte may be used as a cathode electrolyte or as an anode layer protection layer for a lithium metal battery. The anode layer protection layer may be on the anode layer and between the anode layer and the cathode layer.

An ion conductivity of the solid electrolyte at 25° C. may be equal to or greater than about 1 millisiemen per centimeter (mS/cm), equal to or greater than about 1.3 mS/cm, equal to or greater than about 1.5 mS/cm, greater than about 1.6 mS/cm, equal to or greater than about 2.0 mS/cm, in a range of about 2.0 mS/cm to about 20 mS/cm, or in a range of about 2.0 mS/cm to about 10 mS/cm. When the solid electrolyte has a high ion conductivity of about equal to or greater than about 1 mS/cm, the solid electrolyte may be applied as an electrolyte of an electrochemical cell.

According to an embodiment, an electrochemical cell includes a cathode layer; an anode layer; and a solid electrolyte layer disposed between the cathode layer and the anode layer, wherein at least one of the solid electrolyte layer and the cathode layer includes the solid electrolyte comprising the compound of Formula 1. When the solid electrolyte layer includes the solid electrolyte comprising the compound of Formula 1, a side reaction, e.g., with lithium metal in the anode layer, is suppressed, and thus cycle characteristics of the electrochemical cell may improve.

The electrochemical cell may be, for example, an all-solid secondary battery or a lithium air battery, but are not limited thereto, and any suitable material or an electrochemical cell configuration may be used.

In the electrochemical cell, the cathode layer may include a solid electrolyte including a compound represented by Formula 1:

Formula 1

$$(Li_{1-a}M_a)_{7-d+x}PS_{6-d-x+k}N_xX_d$$

wherein, in Formula 1,

M is sodium (Na), potassium (K), calcium (Ca), iron (Fe), magnesium (Mg), silver (Ag), copper (Cu), zirconium (Zr), zinc (Zn), or a combination thereof;

X is chlorine (Cl), bromine (Br), fluorine (F), iodine (1), a pseudohalogen, or a combination thereof; and $$0<x<1,\ 0\leq a<1,\ 0<d\leq 1.8,\text{ and }0\leq k<1,$$

wherein the compound of Formula 1 has an argyrodite crystal structure.

For example, the compound of Formula 1 may be a compound represented by Formula 1-1:

Formula 1-1

$$(Li_{1-a}M_a)_{7-d+x}PS_{6-d-x}N_xX_d$$

wherein, in Formula 1-1,

M is sodium (Na), potassium (K), iron (Fe), magnesium (Mg), calcium (Ca), silver (Ag), copper (Cu), zirconium (Zr), zinc (Zn), or a combination thereof;

X is chlorine (Cl), bromine (Br), fluorine (F), iodine (I), a pseudohalogen, or a combination thereof; and $0<x<1$, $0<a<1$, and $0<d\leq 1.8$.

In an aspect, M is sodium (Na), potassium (K), or a combination thereof.

In the cathode layer, an amount of the solid electrolyte may be in a range of about 2 parts by weight to about 70 parts by weight, for example, about 3 parts by weight to about 70 parts by weight, about 3 parts by weight to about 60 parts by weight, or, about 10 parts by weight to about 60 parts by weight, based on 100 parts by weight of a cathode active material in the cathode layer. When the amount of the solid electrolyte is within these ranges, high-voltage stability of the electrochemical cell may improve.

A capacity retention is equal to or greater than about 85% at a 100th cycle after charging to equal to or greater than 4 Volts, for example, 4.25V and discharging to 2.5 Volts the electrochemical cell in a constant-temperature chamber of 25° C. The capacity retention of the electrochemical cell after charge/discharge of the cell between equal to or greater than 4 V, for example, 4.25V and 2.5 V or less in a constant-temperature chamber of 25° C. may be for example, equal to or greater than about 86%, equal to or greater than about 88%, or in a range of about 88% to about 99.5% at 100 cycles.

The solid electrolyte used in the active material layer in an all-solid-state secondary battery, e.g., in a cathode active material layer of a cathode layer, or in an anode active material layer of an anode layer, may have a different particle size range than a solid electrolyte used in a solid electrolyte layer. The solid electrolyte used in the active material layer, for example, has an average particle diameter, which is smaller than an average particle diameter of the solid electrolyte used in the solid electrolyte layer.

The solid electrolyte used in the active material layer has an average particle diameter of about 100 nanometers (nm) to about 10 micrometers (μm), about 300 nm to about 8 μm, or about 500 nm to about 5 μm. The solid electrolyte used in the solid electrolyte layer has an average particle diameter of about 500 nm to about 20 μm, about 700 nm to about 15 μm, or about 900 nm to about 10 μm. The particle diameter may be determined by light scattering or by SEM analysis, for example.

Hereinafter, as an example of the electrochemical cell, an all-solid secondary battery will be described in detail.

Figure 6:
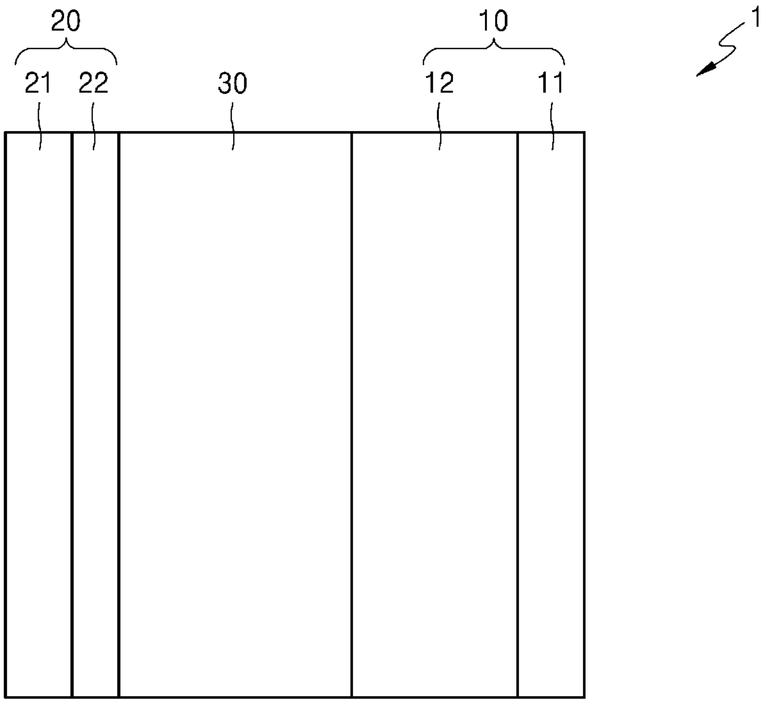
FIGS. 6 to 8 are cross-sectional views of an embodiment of an all-solid secondary battery.
Figure 7:
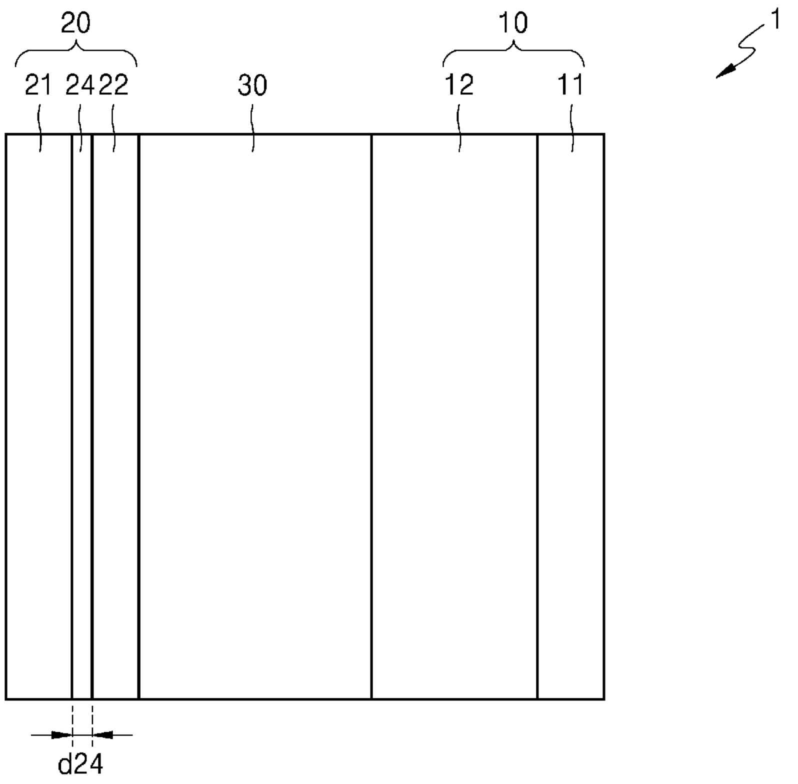
Figure 8:
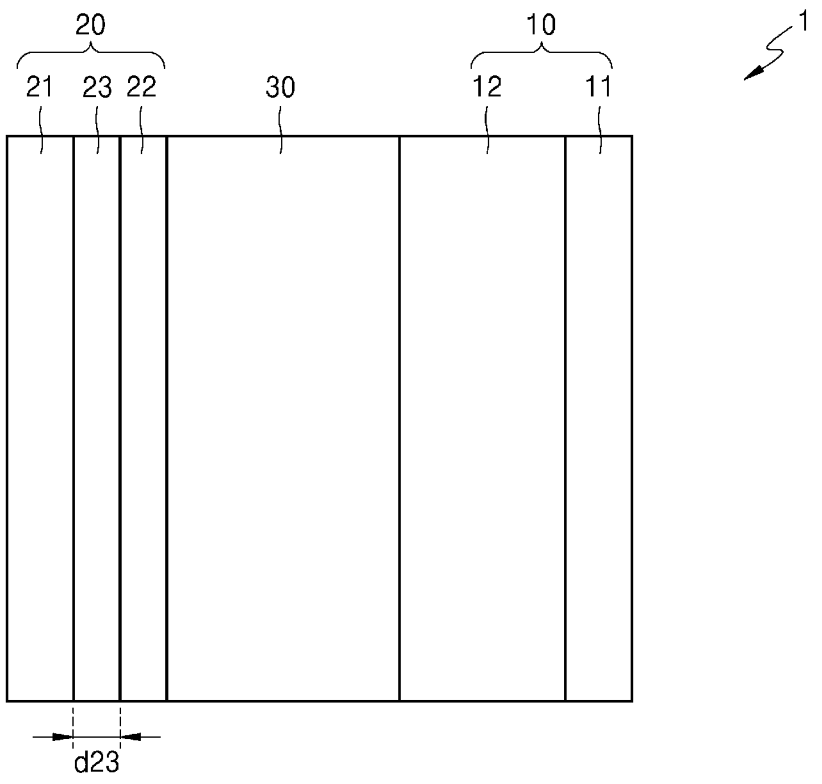

Referring to FIGS. 6 to 8, an all-solid secondary battery 1 includes an anode layer 20 including an anode current collector 21 and a first anode active material layer 22; a cathode layer 10 including a cathode active material layer 12; and a solid electrolyte layer 30 disposed between the anode layer 20 and the cathode layer 10. The cathode layer 10 may include the solid electrolyte. The cathode layer 10 may include, for example, a cathode active material, a solid electrolyte, and a conducting agent.

Anode Layer

Referring to FIGS. 6 to 8, the anode layer 20 includes the anode current collector 21 and the first anode active material layer 22, and the first anode active material layer 22 includes an anode active material.

For example, the anode active material in the first anode active material layer 22 may be in the form of particles. An average particle diameter of the particles may be, for example, about 4 μm or less, about 3 μm or less, about 2 μm or less, about 1 μm or less, or about 900 nm or less. An average particle diameter of the particles may be, for example, in a range of about 10 nm to about 4 μm, about 10 nm to about 3 μm, about 10 nm to about 2 μm, about 10 nm to about 1 μm, or about 10 nm to about 900 nm. When the average particle diameter of the anode active material is within these ranges, reversible absorbing and/or desorbing of lithium during charge/discharge may further be facilitated. The average particle diameter of the anode active material may be, for example, a median diameter (D50) measured by using a laser diffraction particle diameter distribution meter.

The anode active material in the first anode active material layer 22 may include, for example, at least one of a carbonaceous anode active material, a metal, or a metalloid.

The carbonaceous anode active material may be, for example, amorphous carbon. Examples of the amorphous carbon may include carbon black (CB), acetylene black (AB), furnace black (FB), Ketjen black (KB), and graphene, but are not limited thereto, and any suitable material available as amorphous carbon may be used. The amorphous carbon refers to carbon that has no crystallinity or a very low crystallinity, which may be different from crystalline carbon or graphite carbon.

For example, the metal or metalloid anode active material may include at least one of gold (Au), platinum (Pt), palladium (Pd), silicon (Si), silver (Ag), aluminum (Al), bismuth (Bi), tin (Sn), or zinc (Zn), but are not limited thereto, and any suitable material that is available as a metal anode active material or a metalloid anode active material capable of forming an alloy or a compound with lithium may be used. For example, nickel (Ni) does not form an alloy with lithium and thus is not a suitable metal anode active material.

The first anode active material layer 22 may include one of these anode active materials or may include a mixture of a plurality of different anode active materials. For example, the first anode active material layer 22 may only include amorphous carbon or may include at least one of gold (Au), platinum (Pt), palladium (Pd), silicon (Si), silver (Ag), aluminum (Al), bismuth (Bi), tin (Sn), or zinc (Zn). The first anode active material layer 22 may include a mixture including amorphous carbon and at least one of gold (Au), platinum (Pt), palladium (Pd), silicon (Si), silver (Ag), aluminum (Al), bismuth (Bi), tin (Sn), or zinc (Zn). A mixing ratio of amorphous carbon to an element such as gold in the mixture may be a weight ratio in a range of about 10:1 to about 1:2, about 5:1 to about 1:1, or about 4:1 to about 2:1, but are not limited thereto, and the mixing ratio may be selected according to characteristics of the all-solid secondary battery 1. When the anode active material includes a mixture of amorphous carbon and at least one of gold (Au), platinum (Pt), palladium (Pd), silicon (Si), silver (Ag), aluminum (Al), bismuth (Bi), tin (Sn), or zinc (Zn) in the foregoing ratios, cycle characteristics of the all-solid secondary battery 1 may further improve.

The anode active material in the first anode active material layer 22 may include, for example, a mixture including first particles formed of amorphous carbon and second particles formed of a metal or a metalloid. Examples of the metal or the metalloid may include gold (Au), platinum (Pt), palladium (Pd), silicon (Si), silver (Ag), aluminum (Al), bismuth (Bi), tin (Sn), or zinc (Zn). The metalloid may be a semiconductor. An amount of the second particles may be in a range of about 8 weight % to about 60 weight %, about 10 weight % to about 50 weight %, about 15 weight % to about 40 weight %, or about 20 weight % to about 30 weight %, based on the total weight of the mixture. When the amount of the second particles is within these ranges, cycle characteristics of the all-solid secondary battery 1 may further improve.

For example, the first anode active material layer 22 may include a binder. Examples of the binder may include styrene-butadiene rubber (SBR), polytetrafluoroethylene (PTFE), polyvinylidene fluoride (PVDF), polyethylene, a vinylidene fluoride/hexafluoropropylene copolymer, polyacrylonitrile, and polymethylmethacrylate, but are not limited thereto, and any suitable material available as a binder may be used. The binder may comprise one of the examples of the binder alone or a plurality of binders.

When the first anode active material layer 22 includes the binder, the first anode active material layer 22 is stabilized on the anode current collector 21. Also, cracks in the first anode active material layer 22 may be suppressed despite of volume change and/or relative location change of the first anode active material layer 22 during charge/discharge. For example, when the first anode active material layer 22 does not include a binder, the first anode active material layer 22 may be easily separated from the anode current collector 21. When the first anode active material layer 22 is detached from the anode current collector 21, a possibility of a short-circuit occurring may increase as the anode current collector 21 contacts the solid electrolyte layer 30 at the exposed part of the anode current collector 21. The first anode active material layer 22 may be prepared by, for example, coating and drying a slurry on the anode current collector 21. The slurry includes dispersed materials for forming the first anode active material layer 22. When the binder is included in the first anode active material layer 22, the anode active material may be stably dispersed in the slurry. For example, when the slurry is coated on the anode current collector 21 by using a screen printing method, clogging of screen (e.g., screen clogging by an aggregate of the anode active material) may be suppressed.

A thickness (d22) of the first anode active material layer 22 may be, for example, about 50% or less, about 40% or less, about 30% or less, about 20% or less, about 10% or less, or about 5% or less of a thickness (d12) of the cathode active material layer 12. For example, a thickness (d22) of the first anode active material layer 22 may be in a range of about 1 μm to about 20 μm, about 2 μm to about 10 μm, or about 3 μm to about 7 μm. When the thickness (d22) of the first anode active material layer 22 is too thin, lithium dendrites formed between the first anode active material layer 22 and the anode current collector 21 destroys the first anode active material layer 22, and thus cycle characteristics of the all-solid secondary battery 1 may not improve. When the thickness (d22) of the first anode active material layer 22 is too thick, an energy density of the all-solid secondary battery 1 deteriorates and an internal resistance of the all-solid secondary battery 1 by the first anode active material layer 22 increases, and thus cycle characteristics of the all-solid secondary battery 1 may not improve.

For example, when the thickness (d22) of the first anode active material layer 22 decreases, a charge capacity of the first anode active material layer 22 decreases. The charge capacity of the first anode active material layer 22 may be, for example, about 50% or less, about 40% or less, about 30% or less, about 20% or less, about 10% or less, about 5% or less, or about 2% or less of a charge capacity of the cathode active material layer 12. The charge capacity of the first anode active material layer 22 may be, for example, in a range of about 0.1% to about 50%, about 0.1% to about 40%, about 0.1% to about 30%, about 0.1% to about 20%, about 0.1% to about 10%, about 0.1% to about 5%, or about 0.1% to about 2% of a charge capacity of the cathode active material layer 12. When the charge capacity of the first anode active material layer 22 is too low, a thickness of the first anode active material layer 22 is too thin, lithium dendrites formed between the first anode active material layer 22 and the anode current collector 21 during repeated charge/discharge operations destroys the first anode active material layer 22, and cycle characteristics of the all-solid secondary battery 1 may not improve. When the charge capacity of the first anode active material layer 22 is too high, an energy density of the all-solid secondary battery 1 deteriorates and an internal resistance of the all-solid secondary battery 1 by the first anode active material layer 22 increases, and thus cycle characteristics of the all-solid secondary battery 1 may not improve.

The charge capacity of the cathode active material layer 12 is obtained by multiplying a charge capacity density (mAh/g) of the cathode active material by a weight of the cathode active material in the cathode active material layer 12. When various types of materials are used as the cathode active material, a value of a charge capacity density multiplied by a weight of each of the cathode active materials is calculated, and the total of these values refers to a charge capacity of the cathode active material layer 12. A charge capacity of the first anode active material layer 22 may be calculated in the same manner. That is, a charge capacity of the first anode active material layer 22 is obtained by multiplying a charge capacity density (mAh/g) of the anode active material by a weight of the anode active material in the first anode active material layer 22. When various types of materials are used as the anode active material, a value of a charge capacity density multiplied by a weight of each of the anode active materials is calculated, and the total of these values is a charge capacity of the first anode active material layer 22. Here, the charge capacity densities of the cathode active material and the anode active material are obtained from capacities estimated by using an all-solid half-cell in which lithium metal is used as a reference electrode. The charge capacities of the cathode active material layer 12 and the first anode active material layer 22 are directly measured by charge capacity measurement using an all-solid half-cell. When the measured charge capacity is divided by a weight of each of the active materials, a charge capacity density may be obtained. The charge capacities of the cathode active material layer 12 and the first anode active material layer 22 may be initial charge capacities measured in the 1st charging cycle.

The anode current collector 21 may be formed of, for example, a material that does not react with lithium or is not capable of forming an alloy or a compound with lithium. Examples of the material forming the anode current collector 21 may include copper (Cu), stainless steel, titanium (Ti), iron (Fe), cobalt (Co), or nickel (Ni), but are not limited thereto, and any suitable material available as an electrode current collector may be used. The anode current collector 21 may be formed of the metal or an alloy or a coating material of at least two metals. The anode current collector 21 may be, for example, in the form of a plate or a foil.

The first anode active material layer 22 may further include additives that are used in an all-solid secondary battery 1, such as a filler, a dispersant, and an ion conducting agent.

Referring to FIG. 7, the all-solid secondary battery 1 may further include, for example, a thin film 24 on the anode current collector 21, the thin film 24 including an element alloyable with lithium. The thin film 24 is disposed between the anode current collector 21 and the first anode active material layer 22. The thin film 24 may include, for example, an element alloyable with lithium. Examples of the element alloyable with lithium may include gold, silver, zinc, tin, indium, silicon, aluminum, or bismuth, but are not limited thereto, and any suitable element alloyable with lithium may be used. The thin film 24 is formed of any of these metals or an alloy of various metals. When the thin film 24 is disposed on the anode current collector 21, for example, the precipitation of a metal layer as described herein may be further flattened between the thin film 24 and the first anode active material layer 22, and thus cycle characteristics of the all-solid secondary battery 1 may further improve.

A thickness (d24) of the thin film 24 may be, for example, in a range of about 1 nm to about 800 nm, about 10 nm to about 700 nm, about 50 nm to about 600 nm, or about 100 nm to about 500 nm. When the thickness (d24) of the thin film 24 is less than about 1 nm, the thin film 24 may not function properly. When the thickness (d24) of the thin film 24 is too thick, the thin film 24 itself absorbs lithium, and a precipitation amount of lithium in an anode may decrease, which results in deterioration of an energy density of the all-solid secondary battery 1, and thus cycle characteristics of the all-solid secondary battery 1 may be deteriorated. The thin film 24 may be disposed on the anode current collector 21 by using, for example, vacuum vapor deposition, sputtering, or plating, but not limited thereto, and any suitable method capable of forming a thin film may be used.

Referring to FIG. 8, the all-solid secondary battery 1 may further include, for example, a second anode active material layer 23 between the anode current collector 21 and the solid electrolyte layer 30 by charging of the all-solid secondary battery 1. The all-solid secondary battery 1 may further include, for example, a second anode active material layer 23 between the anode current collector 21 and the first anode active material layer 22 by charging of the all-solid secondary battery 1. Although not shown in the drawings, the all-solid secondary battery 1 may further include, for example, a second anode active material layer 23 disposed between the solid electrolyte layer 30 and the first anode active material layer 22 by charging of the all-solid secondary battery 1. Although not shown in the drawings, the all-solid secondary battery 1 may further include, for example, a second anode active material layer 23 in the first anode active material layer 22 by charging of the battery 1.

The second anode active material layer is a metal layer including lithium or a lithium alloy. The metal layer includes lithium or a lithium alloy. In this regard, because the second anode active material layer 23 is a metal layer including lithium, the second anode active material layer 23 may function as, for example, a lithium reservoir. Examples of the lithium alloy may include a Li—Al alloy, a Li—Sn alloy, a Li—In alloy, a Li—Ag alloy, a Li—Au alloy, a Li—Zn alloy, a Li—Ge alloy, or a Li—Si alloy, but are not limited thereto, and any suitable material available as a lithium alloy in the art may be used. The second anode active material layer 23 may be formed of one of these alloys of lithium or may be formed of various alloys.

A thickness (d23) of the second anode active material layer 23 may be, for example, in a range of about 1 μm to about 1000 μm, about 1 μm to about 500 μm, about 1 μm to about 200 μm, about 1 μm to about 150 μm, about 1 μm to about 100 μm, or about 1 μm to about 50 μm, but is not limited thereto. When the thickness (d23) of the second anode active material layer 23 is too thin, the second anode active material layer 23 may not serve as a lithium reservoir. When the thickness (d23) of the second anode active material layer 23 is too thick, a weight and a volume of the all-solid secondary battery 1 increase and cycle characteristics may deteriorate. The second anode active material layer 23 may be, for example, a metal foil having a thickness in the range of about 1 μm to about 1000 μm.

In the all-solid secondary battery 1, the second anode active material layer 23 may be disposed between the anode current collector 21 and the first anode active material layer 22 before assembling the all-solid secondary battery 1 or may be precipitated between the anode current collector 21 and the first anode active material layer 22 after assembling the all-solid secondary battery 1 by charging of the all-solid secondary battery 1.

When the second anode active material layer 23 is disposed between the anode current collector 21 and the first anode active material layer 22 before assembling the all-solid secondary battery 1, the second anode active material layer 23 is a metal layer including lithium and thus may function as a lithium reservoir. In this regard, cycle characteristics of the all-solid secondary battery 1 including the second anode active material layer 23 may further improve. For example, a lithium foil is disposed between the anode current collector 21 and the first anode active material layer 22 before assembling the all-solid secondary battery 1.

When the second anode active material layer 23 is precipitated by charging after assembling the all-solid secondary battery 1, an energy density of the all-solid secondary battery 1 increases due to not including the second anode active material layer 23 during the assembling of the all-solid secondary battery 1. For example, the all-solid secondary battery 1 may be charged over a charge capacity of the first anode active material layer 22. That is, the first anode active material layer 22 is overcharged. In the beginning of the charging, lithium is absorbed in the first anode active material layer 22. That is, an anode active material in the first anode active material layer 22 may form an alloy or a compound with lithium ions migrated from the cathode layer 10. When the first anode active material layer 22 is charged over its capacity, for example, lithium is precipitated on a back surface of the first anode active material layer 22, which is between the anode current collector 21 and the first anode active material layer 22, and a metal layer corresponding to the second anode active material layer 23 may be formed by the precipitated lithium. The second anode active material layer 23 is a metal layer comprising lithium, e.g. lithium metal or a lithium alloy. This occurs because, for example, the anode active material in the first anode active material layer 22 is formed of a material capable of forming an alloy or a compound with lithium. During discharge, lithium of the first anode active material layer 22 and the second anode active material layer 23, i.e., a metal layer, is ionized and migrates towards the cathode layer 10. Thus, lithium may be used as an anode active material in the all-solid secondary battery 1. When the first anode active material layer 22 covers the second anode active material layer 23, the first anode active material layer 22 serves as a protection layer to the second anode active material layer 23 and suppresses precipitation growth of lithium dendrite at the same time. Thus, it may prevent a short-circuit and reduces capacity deterioration of the all-solid secondary battery 1, and as a result, cycle characteristics of the all-solid secondary battery 1 may improve. Also, when the second anode active material layer 23 is formed by charging after the assembling of the all-solid secondary battery 1, the anode current collector 21, the first anode active material layer 22, and a region therebetween are, for example, Li-free regions that do not include lithium metal or a lithium alloy in the initial state or an after-discharge state of the all-solid secondary battery 1.

The all-solid secondary battery 1 may have a structure in which the second anode active material layer 23 is disposed on the anode current collector 21, and the solid electrolyte layer 30 is directly disposed on the second anode active material layer 23. The second anode active material layer 23 may be, for example, a lithium metal layer or a lithium alloy layer.

When the solid electrolyte layer 30 includes the sulfide-based solid electrolyte, a side reaction between the second anode active material layer 23, which is a lithium metal layer, and the solid electrolyte layer 30 is suppressed, and thus cycle characteristics of the all-solid secondary battery 1 may improve.

Solid Electrolyte Layer

Referring to FIGS. 6 to 8, the solid electrolyte layer 30 includes the solid electrolyte between the cathode layer 10 and the anode layer 20.

The solid electrolyte may further include a second solid electrolyte in addition to the solid electrolyte of Formula 1. The solid electrolyte may further include at least one of $Li_2S—P_2S_5$, $Li_2S—P_2S_5—LiX$ (where X is a halogen element), $Li_2S—P_2S_5—Li_2O$, $Li_2S—P_2S_5—Li_2O—LiI$, $Li_2S—SiS_2$, $Li_2S—SiS_2—LiI$, $Li_2S—SiS_2—LiBr$, $Li_2S—SiS_2—LiCl$, $Li_2S—SiS_2—B_2S_3—LiI$, $Li_2S—SiS_2—P_2S_5—LiI$, $Li_2S—B_2S_3$, $Li_2S—P_2S_5—Z_mS_n$ (where m and n are each a positive integer, and Z is one of Ge, Zn, or Ga), $Li_2S—GeS_2$, $Li_2S—SiS_2—Li_3PO_4$, or $Li_2S—SiS_2—Li_pMO_q$ (where p and q are each a positive integer, and M is at least one of P, Si, Ge, B, Al, Ga, or In). The second solid electrolyte may be a sulfide-based solid electrolyte, which is further included in the solid electrolyte, and may be amorphous, crystalline, or a mixture thereof.

The second solid electrolyte may be a sulfide-based solid electrolyte and may further include, for example, an argyrodite-type solid electrolyte represented by Formula 5-1:

Formula 5-1

$$Li^{+}_{12-n-x}A^{n+}X'^{2-}_{6-x}Y'^{-}_{x}$$

wherein, in Formula 5-1,

A is P, As, Ge, Ga, Sb, Si, Sn, Al, In, Ti, V, Nb, Ta, or a combination thereof;

X' is S, Se, Te, or a combination thereof;

Y' is Cl, Br, I, F, CN, OCN, SCN, $N_3$ or a combination thereof; and $0 \le x \le 2$ and n is an oxidation number of A. In an aspect, n is 2 to 5.

Examples of the argyrodite-type solid electrolyte may include at least one of $Li_{7-x}PS_{6-x}Cl_x$ (where $0 \le x \le 2$), $Li_{7-x}PS_{6-x}Br_x$ (where $0 \le x \le 2$), or $Li_{7-x}PS_{6-x}I_x$ (where $0 \le x \le 2$).

The argyrodite-type solid electrolyte particularly includes at least one of $Li_6PS_5Cl$, $Li_6PS_5Br$, or $Li_6PS_5I$.

The solid electrolyte layer 30 may further include, for example, a binder. Examples of a binder included in the solid electrolyte layer 30 may include styrene butadiene rubber (SBR), polytetrafluoroethylene, polyvinylidene fluoride, polyethylene, or a combination thereof, but are not limited thereto, and any suitable material available as a binder may be used. The binder of the solid electrolyte layer 30 may be identical to or different from the binders of the cathode active material layer 12 and the first anode active material layer 22.

Cathode Layer

The cathode layer 10 includes the cathode current collector 11 and the cathode active material layer 12.

The cathode current collector 11 may be a plate or a foil formed of, for example, indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. The cathode current collector 11 may be omitted.

The cathode active material layer 12 may include, for example, a cathode active material and a solid electrolyte. The solid electrolyte in the cathode active material layer 10 may be similar to or different from the solid electrolyte in the solid electrolyte layer 30. The solid electrolyte in the cathode active material layer may be the same as the solid electrolyte layer 30. The cathode active material layer 12 may include the solid electrolyte according to an embodiment.

A cathode layer may include a cathode active material, and the cathode active material may be a compound capable of reversibly absorbing and desorbing, intercalating, lithium ions. The cathode active material may be, for example, at least one of a lithium transition metal oxide having a layered crystal structure, a lithium transition metal oxide having an olivine crystal structure, or a lithium transition metal oxide having a spinel crystal structure. Examples of the cathode active material may include a lithium transition metal oxide such as a lithium cobalt oxide (LCO), a lithium nickel oxide, a lithium nickel cobalt oxide, a lithium nickel cobalt aluminum oxide (NCA), a lithium nickel cobalt manganate (NCM), a lithium manganate, or a lithium iron phosphate; a nickel sulfide; a copper sulfide; a lithium sulfide; an iron oxide; or a vanadium oxide, but are not limited thereto, and any suitable material available as a cathode active material may be used. The cathode active material may be formed of a single material or as a mixture of at least two of the cathode active materials.

The cathode active material may be a compound represented by at least one of the following formulae:

$Li_aA_{1-b}B'_bD_2$ (where $0.90 \le a \le 1$ and $0 \le b \le 0.5$); $Li_aE_{1-b}B'_bO_{2-c}D_c$ (where $0.90 \le a \le 1$, $0 \le b \le 0.5$, and $0 \le c \le 0.05$); $LiE_{2-b}B'_bO_{4-c}D_c$ (where $0 \le b \le 0.5$ and $0 \le c \le 0.05$); $Li_aNi_{1-b-c}Co_bB'_cD_\alpha$ (where $0.90 \le a \le 1$, $0 \le b \le 0.5$, $0 \le c \le 0.05$, and $0 < \alpha \le 2$); $Li_aNi_{1-b-c}Co_bB'_cO_{2-\alpha}F'_\alpha$ (where $0.90 \le a \le 1$, $0 \le b \le 0.5$, $0 \le c \le 0.05$, and $0 < \alpha < 2$); $Li_aNi_{1-b-c}Co_bB'_cO_{2-\alpha}F'_2$ (where $0.90 \le a \le 1$, $0 \le b \le 0.5$, $0 \le c \le 0.05$, and $0 < \alpha < 2$); $Li_aNi_{1-b-c}Mn_bB'_cD_\alpha$ (where $0.90 \le a \le 1$, $0 \le b \le 0.5$, $0 \le c \le 0.05$, and $0 < \alpha \le 2$); $Li_aNi_{1-b-c}Mn_bB'_cO_{2-\alpha}F_\alpha$ (where $0.90 \le a \le 1$, $0 \le b \le 0.5$, $0 \le c \le 0.05$, and $0 < \alpha < 2$); $Li_aNi_{1-b-c}Mn_bB'_cO_{2-\alpha}F'_2$ (where $0.90 \le a \le 1$, $0 \le b \le 0.5$, $0 \le c \le 0.05$, and $0 < \alpha < 2$); $Li_aNi_bE_cG_dO_2$ (where $0.90 \le a \le 1$, $0 \le b \le 0.9$, $0 \le c \le 0.5$, and $0.001 \le d \le 0.1$); $Li_aNi_bCo_cMn_dGeO_2$ (where 0.90≤a 1, $0 \le b \le 0.9$, $0 \le c \le 0.5$, $0 \le d \le 0.5$, and $0.001 \le e \le 0.1$); $Li_aNiG_bO_2$ (where $0.90 \le a \le 1$ and $0.001 \le b \le 0.1$); $Li_aCoG_bO_2$ (where $0.90 \le a \le 1$ and $0.001 \le b \le 0.1$); $Li_aMnG_bO_2$ (where $0.90 \le a \le 1$ and $0.001 \le b \le 0.1$); $Li_aMn_2G_bO_4$ (where $0.90 \le a \le 1$ and $0.001 \le b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \le f \le 2$); $Li_{(3-f)}Fe_2(PO_4)_3$ (where $0 \le f \le 2$); or $LiFePO_4$, wherein, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; F may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof. The compounds listed above as cathode active materials may have a surface coating layer (hereinafter, also referred to as "coating layer"). Alternatively, a mixture of a compound without a coating layer and a compound having a coating layer, may be used. In some embodiments, the coating layer may include, for example, a coating element compound of an oxide, a hydroxide, an oxyhydroxide, an oxycarbonate, or a hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof. In some embodiments, the coating layer may be formed using any method that does not adversely affect the physical properties of the cathode active material. For example, the coating layer may be formed using a spray coating method or a dipping method. Any suitable coating method may be used.

The cathode active material may include, for example, a lithium salt of a transition metal oxide that has a layered rock-salt type structure among the examples of the lithium transition metal oxide. For example, the "layered rock-salt type structure" refers to a structure in which an oxygen atom layer and a metal atom layer are alternately and regularly arranged in a <111> direction in a cubic rock-salt type structure, where each of the atom layers forms a two-dimensional flat plane. The "cubic rock-salt type structure" refers to a sodium chloride (NaCl) type structure, which is one of the crystalline structures, in particular, to a structure in which face-centered cubic (fcc) lattices respectively formed of anions and cations are shifted by only a half of the ridge of each unit lattice. Examples of the lithium transition metal oxide having the layered rock-salt type structure may include a ternary lithium transition metal oxide expressed as $LiNi_xCo_yAl_zO_2$ (NCA) or $LiNi_xCo_yMn_zO_2$ (NCM) (where $0<x<1$, $0<y<1$, $0<z<1$, and $x+y+z=1$). When the cathode active material includes a ternary transition metal oxide having the layered rock-salt type structure, an energy density and thermal stability of an all-solid secondary battery 1 may further improve.

The cathode active material may be covered by a coating layer. The coating layer is any suitable material that may be used as a coating layer of a cathode active material of an all-solid secondary battery. The coating layer may be, for example, $Li_2O—ZrO_2$.

When the cathode active material includes nickel (Ni) as a ternary lithium transition metal oxide such as NCA or NCM, a capacity density of the all-solid secondary battery increases. Also, in a charged state of the all-solid-state battery using the cathode active material, metal elution from the cathode active material may be reduced. As a result, the cycle characteristics of the all-solid secondary battery improve.

A shape of the cathode active material may be, for example, in the form of a particle including a true spherical shape or an elliptical shape. A particle diameter of the cathode active material is not particularly limited and may be in a range applicable to a cathode active material of an all-solid secondary battery. An amount of the cathode active material of the cathode layer is not particularly limited and may be in a suitable range applicable to a cathode layer of an all-solid secondary battery.

The cathode layer may further include, for example, additives such as a conducting agent, a binder, a filler, a dispersant, or an ion conducting agent in addition to the cathode active material and the solid electrolyte. Examples of the conducting agent may include graphite, carbon black, acetylene black, Ketjen black, carbon fiber, or a metal powder. Examples of the binder may include styrene butadiene rubber (SBR), polytetrafluoroethylene, polyvinylidene fluoride, or polyethylene. The filler, the dispersant, or the ion conducting agent that may be added to the cathode layer may be materials that are suitable in an electrode of an all-solid secondary battery.

According to an embodiment, a method of preparing a solid electrolyte includes providing a sulfur (S) precursor, a phosphorus (P) precursor, an X precursor, and a nitrogen (N) precursor; and mixing the sulfur (S) precursor, the phosphorus (P) precursor, the X precursor, and the nitrogen (N) precursor to prepare a solid electrolyte precursor, and then heat-treating the solid electrolyte precursor at a temperature about 300° C. or higher. X of the X precursor may be chlorine (Cl), bromine (Br), fluorine (F), iodine (I), a pseudohalogen, or a combination thereof.

At least one of the sulfur precursor, phosphorus precursor, X precursor, or nitrogen precursor may include lithium.

Examples of the sulfur precursor may include $Li_2S$, and examples of the phosphorus precursor may include $P_2S_5$, red phosphorus, white phosphorus, phosphorus powders, $(NH_4)_2HPO_4$, $(NH_4)H_2PO_4$, $Na_2HPO_4$, or $Na_3PO_4$.

Examples of the nitrogen precursor may include $Li_3N$ or $N_2S_3$.

Examples of the X precursor may include a lithium halide. Examples of the lithium halide may include LiCl, LiI, or LiBr.

The precursor mixture may further include an M precursor. M of the M precursor may be sodium (Na), potassium (K), calcium (Ca), iron (Fe), magnesium (Mg), silver (Ag), copper (Cu), zirconium (Zr), zinc (Zn), or a combination thereof.

The mixing of the precursor mixture may include, for example, reacting the mixture to obtain a solid electrolyte precursor, and the solid electrolyte precursor is heat-treated at a temperature equal to or greater than about 300° C. to prepare a solid electrolyte. The solid electrolyte may include nitrogen and thus may extend a temperature range at which an ion conductive phase is formed.

The heat-treating temperature may be, for example, in a range of about 300° C. to about 600° C., about 300° C. to about 550° C., or about 350° C. to about 500° C. When the heat-treating is performed at a temperature lower than about 300° C., a solid electrolyte does not have an argyrodite crystal structure.

Although a method of mixing the mixture is not particularly limited, examples of the method may include a mechanical milling (MM). For example, when the mechanical milling is used, starting materials such as $Li_2S$ or $P_2S_5$ are reacted by stirring with a ball mill to prepare a solid electrolyte precursor. Although a stirring rate and a stirring time of the mechanical milling are not particularly limited, a production rate of the solid electrolyte precursor increases as the stirring rate increases, and a conversion rate of the starting materials to the solid electrolyte precursor may increase as the stirring time increases.

Thereafter, the solid electrolyte precursor obtained by the mechanical milling is heat-treated at a predetermined temperature, and then the solid electrolyte precursor is pulverized to prepare a solid electrolyte in the form of a particle. When the solid electrolyte has glass transition characteristics, the solid electrolyte may be changed from amorphous to crystalline by the heat-treatment. A temperature for the heat-treating may be, for example, in a range of about 400°

C. to about 600° C. When the temperature for the heat-treating is within this range, a solid electrolyte having a uniform composition may be obtained.

The heat-treating time may vary depending on the temperature of the heat-treating, and, for example, the heat-treating may be performed for about 1 hour to about 100 hours, about 10 hours to about 80 hours, about 10 hours to about 50 hours, about 10 hours to about 30 hours, or about 10 hours to about 20 hours. When the time for the heat-treating is within these ranges, the solid electrolyte may have excellent ion conductivity and high-temperature stability.

An atmosphere for the heat-treating is an inert atmosphere or vacuum atmosphere. Examples of the atmosphere for the heat-treating may include nitrogen and argon, but are not limited thereto, and any suitable material available as an inert atmosphere may be used.

A thickness of the solid electrolyte may be in a range of about 10 μm to about 200 μm. When the thickness of the solid electrolyte is within this range, the all-solid secondary battery may have improved cycle characteristics and improved capacity retention.

According to an embodiment, a method of preparing an all-solid secondary battery may include preparing a solid electrolyte by using the method described above; preparing, for example, a cathode layer 10, an anode layer 20, and/or a solid electrolyte layer 30 each separately by using the solid electrolyte; and stacking these layers.

A thickness of the solid electrolyte layer 30 may be in a range of about 10 μm to about 200 μm.

Preparation of Anode Layer

Materials forming a first anode active material layer 22, such as an anode active material, a conducting agent, a binder, and a solid electrolyte are added to a polar solvent or a non-polar solvent to prepare a slurry. The slurry is coated and dried on an anode current collector 21 to prepare a first stack. Then, the dried first stack is pressed to prepare an anode layer 20. The pressing of the first stack may be performed by using a roll press or a flat press, but embodiments are not limited thereto, and any suitable pressing method available may be used. The pressing may be omitted.

The anode layer includes an anode current collector and a first anode active material layer including an anode active material disposed on the anode current collector, wherein the anode active material includes at least one of a carbonaceous anode active material or a metal or metalloid anode active material, wherein the carbonaceous anode active material includes at least one of amorphous carbon or crystalline carbon. Also, the metal or metalloid anode active material is at least one of gold (Au), platinum (Pt), palladium (Pd), silicon (Si), silver (Ag), aluminum (Al), bismuth (Bi), tin (Sn), or zinc (Zn).

The anode layer may further include a second anode active material layer disposed between the anode current collector and the first anode active material layer or between the solid electrolyte layer and the first anode active material layer, wherein the second anode active material layer is a metal layer including lithium or a lithium alloy.

Preparation of Cathode Layer

Materials forming a cathode active material layer 12, such as a cathode active material, a conducting agent, a binder, and a starting material for the solid electrolyte are added to a non-polar solvent to prepare a slurry. The slurry is coated and dried on a cathode current collector 11 to prepare a stack. The stack is pressed to prepare a cathode layer 10. The pressing of the stack may be performed by using a roll press, a flat press, or an isostatic press, but is not limited thereto, and any suitable pressing method available may be used.

The pressing may be omitted. In some embodiments, the mixture of the materials forming the cathode active material layer 12 is densification-molded in the form of a pellet or extension-molded in the form of sheet. When the cathode active material layer 12 is prepared in this manner a cathode current collector 11 may be omitted.

Preparation of Solid Electrolyte Layer

According to an embodiment, a solid electrolyte layer 30 includes the solid electrolyte.

The solid electrolyte layer 30 may further include a sulfide-based solid electrolyte that is used in an all-solid secondary battery, in addition to the solid electrolyte disclosed herein.

The sulfide-based solid electrolyte may be prepared, for example, by mixing, coating and drying, and pressing a starting material for the sulfide-based solid electrolyte, a solvent, and a binder. In an embodiment, the sulfide-based solid electrolyte prepared by using the method of preparing a sulfide-based solid electrolyte may be vapor-deposited by using a film-forming method, such as an aerosol deposition method, a cold spray method, or a sputtering method, to prepare a solid electrolyte. In an embodiment, the solid electrolyte may be prepared by pressing of a substance of the solid electrolyte particles.

Preparation of all-Solid Secondary Battery

The cathode layer 10, the anode layer 20, and the solid electrolyte layer 30 prepared by using the method are stacked such that the solid electrolyte layer 30 is between the cathode layer 10 and the anode layer 20 and then pressed to prepare an all-solid secondary battery 1.

In some embodiments, the solid electrolyte layer 30 is disposed on the cathode layer 10 to prepare a second stack. Then, the anode layer 20 is disposed on the second stack such that the first anode active material layer contacts the solid electrolyte layer 30 to prepare a third stack, and the third stack is pressed to prepare an all-solid secondary battery 1. The pressing may be performed at a temperature, for example, in a range of room temperature (about 20° C. to about 25° C.) to about 90° C. In an embodiment, the pressing may be performed at a temperature of about 100° C. or greater than 100° C. The pressing is performed, for example, for about 30 minutes or less, about 20 minutes or less, about 15 minutes or less, or about 10 minutes or less. The pressing is performed, for example, for about 1 minute to about 30 minutes, about 1 minute to about 20 minutes, about 1 minute to about 15 minutes, or about 1 minute to about 10 minutes. A method of the pressing may be performed by using an isostatic press, a roll press, or a flat press, but is not limited thereto, and any suitable pressing method may be used. A pressure for the pressing may be, for example, about 500 megapascals (MPa) or less, about 400 MPa or less, about 300 MPa or less, about 200 MPa or less, or about 100 MPa or less. A pressure for the pressing may be, for example, in a range of about 50 MPa to about 500 MPa, about 50 MPa to about 480 MPa, about 50 MPa to about 450 MPa, about 50 MPa to about 400 MPa, about 50 MPa to about 350 MPa, about 50 MPa to about 300 MPa, about 50 MPa to about 250 MPa, about 50 MPa to about 200 MPa, about 50 MPa to about 150 MPa, or about 50 MPa to about 100 MPa. For example, the solid electrolyte powder may be sintered by the pressing and form one solid electrolyte.

The structure and the preparation method of the all-solid secondary battery are examples, where members of the structure and steps of the preparation method may be appropriately modified.

One or more embodiments in relation to the method of preparing a solid electrolyte will now be described in more detail with reference to the following examples and comparative examples. However, these examples are only for illustrative purposes and are not intended to limit the scope of the one or more embodiments.

EXAMPLES

Preparation of Solid Electrolyte

Example 1

$Li_2S$, $P_2S_5$, LiCl, and $Li_3N$ were mixed to obtain a precursor mixture, amounts of $Li_2S$, $P_2S_5$, LiCl, and $Li_3N$ in the preparation of the precursor mixture were each measured at a stoichiometric ratio to obtain $Li_{6.125}PS_{4.875}N_{0.125}Cl$, and the resultant was mixed by performing a mechanical milling treatment for 20 hours by using a high energy mill (Pulnerisette 7). The mechanical milling treatment was performed at a rotation rate of 380 rpm, at 25° C., and in an argon atmosphere for 20 hours to obtain a powder material. 300 mg of the powder material obtained from the mechanical milling treatment was heat-treated in a vacuum atmosphere at 500° C. for 12 hours to obtain a solid electrolyte. In the solid electrolyte ($Li_{6.125}PS_{4.875}N_{0.125}Cl$) of Example 1, the amount of nitrogen is 2.5 mol % based on the total amount of sulfur and nitrogen.

Example 2

A solid electrolyte was obtained in the same manner as in Example 1, except that the amounts of $Li_2S$, $P_2S_5$, LiCl, and $Li_3N$ were stoichiometrically selected to obtain $Li_{6.25}PS_{4.75}N_{0.25}Cl$ and that the heat-treatment was performed at 500° C. for 12 hours. In the $Li_{6.25}PS_{4.75}N_{0.25}Cl$ of Example 2, the amount of nitrogen is 5 mol % based on the total amount of sulfur and nitrogen.

Example 3

A solid electrolyte was obtained in the same manner as in Example 1, except that the amounts of $Li_2S$, $P_2S_5$, LiCl, and $Li_3N$ were stoichiometrically selected to obtain $Li_{6.25}PS_{4.5}N_{0.5}Cl$ and that the heat-treatment was performed at 500° C. for 12 hours. In the solid electrolyte $Li_{6.5}PS_{4.5}N_{0.5}Cl$ of Example 3, the amount of nitrogen is 10 mol % based on the total amount of sulfur and nitrogen.

Example 4

A solid electrolyte was obtained in the same manner as in Example 1, except that LiBr was further used in the preparation of a precursor mixture, the amounts of $Li_2S$, $P_2S_5$, LiCl, LiBr, and $Li_3N$ were stoichiometrically selected to obtain $Li_{6.25}PS_{4.75}N_{0.25}Cl_{0.5}Br_{0.5}$, and the heat-treatment was performed at 450° C. for 12 hours.

Example 5-1 to 5-5

A solid electrolyte was obtained in the same manner as in Example 1, except that the amounts of $Li_2S$, $Na_2S$, $K_2S$, $P_2S_5$, LiCl, LiBr, and $Li_3N$ were stoichiometrically selected to obtain a solid electrolyte having a composition shown in Table 1.

TABLE 1

| Sample | Solid electrolyte | Temperature and time for heat-treatment |
|---|---|---|
| 5-1 | $Li_6Na_{0.125}PS_{4.875}N_{0.125}Cl$ | 500 °C for 12 hours |
| 5-2 | $Li_6Na_{0.125}PS_{4.875}N_{0.125}Cl_{0.5}Br_{0.5}$ | 450 °C for 12 hours |
| 5-3 | $Li_{6.1}PS_{4.9}N_{0.1}Cl$ | 500 °C for 12 hours |
| 5-4 | $Li_{6.5}PS_{5.5}N_{0.5}Cl$ | 500 °C for 12 hours |
| 5-5 | $Li_{5.9}K_{0.1}Na_{0.125}PS_{4.875}N_{0.125}Cl$ | 500 °C for 12 hours |

In Table 1, Example 5-5 represents a solid electrolyte in which a portion of lithium (Li) of a solid electrolyte was substituted with potassium (K) and a portion of sulfur (S) was substituted with nitrogen (N).

Comparative Example 1

A solid electrolyte was obtained in the same manner as in Example 1, except that $Li_2S$, $P_2S_5$, and LiCl were used for the preparation of the precursor mixture, the amounts of $Li_2S$, $P_2S_5$, and LiCl were stoichiometrically selected to obtain $Li_6PS_5Cl$, and the heat-treatment was performed at 500° C. for 12 hours.

Comparative Example 2

A solid electrolyte was obtained in the same manner as in Example 1, except that the heat-treatment was performed at 250° C.

The target argyrodite-type solid electrolyte was not obtained in Comparative Example 2.

Comparative Example 3

$LiN_3$ (lithium azide), $S_8$, $Li_2S$, and $P_2S_5$ were prepared in a stoichiometric ratio under an argon gas atmosphere and a mixture of the same was inserted in a graphite halite ampoule and melted in a vacuum condition. Subsequently, heat treatment was performed on the resultant at 550° C. in a tubular furnace for 6 days. After the heat treatment, $Li_6PS_5N_3$ was obtained by slowly cooling the mixture.

$Li_6PS_5N_3$, obtained according to Comparative Example 3, did not have a crystal structure in which $N_3$ substitutes sulfur (S) as in the argyrodite-type solid electrolyte of Example 1.

Comparative Example 3A

A particulate solid electrolyte glass was obtained in the same manner as Comparative Example 1, except that a raw material composition 0.5360 g of $Li_2S$, 0.8910 g of $P_2S_5$, 0.2861 g of LiI, 0.2785 g of LiBr, and 0.0084 g of $Li_3N$ (with high purity, manufactured by a chemical company) was used for the precursor mixture. Here, an amount of $Li_3N$ was 1.13 mol % based on 100 mol % of the sum of $Li_2S$, $P_2S_5$, LiI, LiBr and $Li_3N$.

An amorphous sulfide solid electrolyte including nitrogen (N) was obtained by heating the prepared electrolyte glass under an inert gas atmosphere at a crystallization temperature or a temperature greater than a crystallization temperature, for 3 hours.

The amorphous sulfide solid electrolyte was obtained according to Comparative Example 3A. An ion conductivity of the amorphous sulfide solid electrolyte is about 0.3 mS/cm, which was reduced compared to Example 1.

Preparation Example 1

A cathode active material having an a $Li_2O$—$ZrO_2$ coating layer was prepared in the same manner disclosed in Korean Patent No. 10-2016-0064942, the content of which is incorporated by reference in its entirety. The cathode active material was prepared as follows.

A cathode active material, a lithium methoxide, and a zirconium propoxide were stirred and mixed for 30 minutes in a mixture solution of ethanol and ethyl acetoacetate to prepare an alcohol solution of a $Li_2O$—$ZrO_2$ (where a=1) (a coating solution for coating a $Li_2O$—$ZrO_2$). Amounts of the lithium methoxide and zirconium propoxide were controlled such that an amount of a $Li_2O$—$ZrO_2$ (where a=1) coated on the surface of a cathode active material NCM was about 0.4 parts by weight, based on 100 parts by weight of NCM.

Then, the coating solution for coating $aLi_2O$—$ZrO_2$ was mixed with $LiNi_{=0.8}Co_{0.15}Mn_{0.05}O_2$ (NCM) as a cathode active material, and this mixed solution was heated to about 40° C. while stirring to evaporate a solvent, such as an alcohol, therefrom. An ultrasonic wave was radiated to the mixed solution.

By following this process, a precursor for $aLi_2O$—$ZrO_2$ (where a=1) was supported on the surface of the cathode active material.

Also, the precursor for $aLi_2O$—$ZrO_2$ (where a=1) supported on the surface of the cathode active material was heat-treated at a temperature of 350° C. in an oxygen atmosphere for 1 hour. Due to the heat-treatment, the precursor for $aLi_2O$—$ZrO_2$ (where a=1) present on the surface of the cathode active material was changed into $aLi_2O$—$ZrO_2$ (where a=1). An amount of $Li_2O$—$ZrO_2$ (LZO) is about 0.4 parts by weight, based on 100 parts by weight of NCM.

By following this process, $LiNi_{0.8}Co_{0.15}Mn_{0.05}O_2$ (NCM) having an $aLi_2O$—$ZrO_2$ coating layer was obtained. In $aLi_2O$—$ZrO_2$, a is 1.

Preparation of all-Solid Secondary Battery

Example 6

Cathode Layer $LiNi_{0.8}Co_{0.15}Mn_{0.05}O_2$(NCM) coated with $Li_2O$—$ZrO_2$ (LZO) obtained in Preparation Example 1 was prepared as a cathode active material.

The solid electrolyte powder prepared in Example 1 was prepared as a solid electrolyte. Carbon nanofibers (CNFs) were prepared as a conducting agent. These materials were mixed at a weight ratio of cathode active material:solid electrolyte:conducting agent=60:35:5 and molded in the form of a sheet to prepare a cathode sheet. The cathode sheet was pressed on a cathode current collector formed of a carbon-coated aluminum foil having a thickness of 18 μm to prepare a cathode layer. The cathode layer was about 100 μm.

Anode Layer

A lithium metal having a thickness of about 30 μm was used as an anode layer.

Solid Electrolyte Layer

A styrene-butadiene rubber (SBR) binder was added to a crystalline argyrodite-type solid electrolyte ($Li_6PS_5Cl$) to prepare a mixture. The amount of a styrene-butadiene rubber (SBR) binder was 1 part by weight based on 100 parts by weight of the crystalline argyrodite-type solid electrolyte ($Li_6PS_5Cl$) Xylene and diethylbenzene were added to the mixture while stirring to prepare a slurry. The slurry was coated on a non-woven fabric by using a blade coater and dried at a temperature of 40° C. in the air to prepare a laminate. The laminate was vacuum-dried at a temperature of 40° C. for 12 hours. By following this process, a solid electrolyte layer was prepared.

The solid electrolyte layer was disposed on the anode layer, and the cathode layer was disposed on the solid electrolyte layer to prepare a laminate. This stack was plate press-treated at a temperature of 25° C. and a pressure of 100 MPa for 10 minutes. Due to the press-treatment, the solid electrolyte layer was sintered, and thus cell characteristics of all-solid secondary batteries were improved.

Examples 7 to 10

All-solid secondary batteries were each prepared in the same manner as in Example 6, except that the solid electrolyte prepared in Example 1 in the cathode layer was changed to the solid electrolytes prepared in Examples 2 to 5, each respectively.

Here, Example 5 includes Example 5-1 to 5-5.

Comparative Examples 4 and 5

All-solid secondary batteries were each prepared in the same manner as in Example 6, except that the solid electrolyte prepared in Example 1 in the cathode layer was changed to the solid electrolytes prepared in Comparative Examples 1 and 2, each respectively.

Evaluation Example 1: Ion Conductivity Measurement

Powders of the solid electrolytes prepared in Examples 1 and 2 were each put into a mold having a diameter of 10 mm and pressed at a pressure of 350 MPa to mold into a pellet. Two surfaces of the pellet were coated with an indium (In) thin film to prepare a sample for ion conductivity measurement. An impedance of the sample was measured by using an Autolab PGSTAT30 potentiostat (Metrohm Autolab Co. Ltd.), the Nyquist plot was drawn, and ion conductivities of the sample at 25° C., 45° C., or 60° C. were measured therefrom.

The measured ion conductivities are shown in Table 2.

TABLE 2

| | Ion conductivity (mS/cm) | | |
|---|---|---|---|
| Sample | 25 °C | 45 °C | 60 °C |
| Example 1 | 2.21 | 5.02 | 8.52 |
| Example 2 | 1.51 | 3.44 | 5.52 |
| Comparative Example 1 | 2.21 | 4.81 | — |

As shown in Table 2, the solid electrolyte of Example 1 had improved ion conductivities compared to those of the solid electrolyte of Comparative Example 1 at temperatures of 25° C., 45° C., and 60° C., and the solid electrolyte of Example 2 had an ion conductivity equal to or greater than 1 mS/cm, which confirmed that the solid electrolyte had an ion conductivity appropriate to a solid electrolyte for an all-solid secondary battery.

Also, ion conductivities of the solid electrolyte of Example 3 were also evaluated in the same manner performed on the solid electrolyte of Example 1. As a result, the ion conductivities of the solid electrolyte of Example 3 were similar to those of the solid electrolyte of Example 1.

Powder of the solid electrolyte prepared according to Example 5-1 to 5-5 was prepared, as a sample for measuring an ion conductivity, by the same method of the solid electrolyte powder of Example 1.

TABLE 3

| Sample | Ion conductivity (mS/cm) (25 °C) |
|---|---|
| 5-1 | 2.5 |
| 5-2 | 3 |
| 5-3 | 2.19 |
| 5-4 | 1.45 |
| 5-5 | 0.6 |

With reference to Table 3, the solid electrolyte of Example 5-1 exhibited a greater ion conductivity, due to Na substitution, than the solid electrolyte of Example 1. The solid electrolyte of Example 5-2 exhibited greater ion conductivity, due to Br substitution in the composition of the solid electrolyte of Example 5-2, than the solid electrolyte of Example 5-1.

The solid electrolyte of Example 5-3 exhibited an ion conductivity at the same level as the solid electrolyte of Example 1, and the solid electrolyte of Example 5-4 exhibited an ion conductivity at 1.5 mS/cm or lower the same as the solid electrolyte of Example 2. In the solid electrolyte of Example 5-5, K was substituted, and had a lower ion conductivity than Example 5-1. The solid electrolyte of Example 5-5 contained potassium had lower structural stability than the solid electrolyte of Example 5-1 contained lithium.

Evaluation Example 2: X-Ray Diffraction (XRD) Analysis

X-ray diffraction (XRD) spectra of the solid electrolytes prepared in Examples 1 and 2 and Comparative Example 1 were measured, and the results are shown in FIG. 1. The XRD analysis was performed by using D8 Advance (available from Bruker), using Cu Kα radiation.

Referring to FIG. 1, the solid electrolytes of Examples 1 and 2 also had an argyrodite crystal structure as did the solid electrolyte of Comparative Example 1.

Evaluation Example 3: High Rate Characteristics

Charge/discharge characteristics of the all-solid secondary batteries of Examples 6 and 7 and Comparative Example 4 were evaluated by using the following charge/discharge test. The charge/discharge test was performed by placing the all-solid secondary batteries in a constant-temperature chamber of 25° C.

The all-solid secondary batteries were charged with a constant current at a rate of 0.1 (C) for 10 hours until the battery voltage was 4.25 volts (V) and then discharged at a constant current at a rate of 0.05 C for 20 hours until the battery voltage reached 2.5 V (1st cycle).

Subsequently, the batteries were charged with a constant current at a rate of 0.1 C for 10 hours until the battery voltage was 4.25 V and then discharged at a constant current at a rate of 0.33 C for 3 hours until the battery voltage reached 2.5 V (2nd cycle).

Next, the batteries were charged with a constant current at a rate of 0.1 C for 10 hours until the battery voltage was 4.25 V. Then, the batteries were discharged at a constant current at a rate of 0.5 C for 2 hours until the battery voltage reached 2.5 V (3rd cycle).

Next, the batteries were charged with a constant current at a rate of 0.1 C for 10 hours until the battery voltage was 4.25 V. Then, the batteries were discharged at a constant current at a rate of 1 C for 1 hour until the battery voltage reached 2.5 V (4th cycle).

Next, the batteries were charged with a constant current at a rate of 0.1 C for 10 hours until the battery voltage was 4.25 V. Then, the batteries were discharged at a constant current at a rate of 0.1 C for 10 hours until the battery voltage reached 2.5 V (5th cycle).

Next, the batteries were charged with a constant current at a rate of 0.33 C for 3 hours until the battery voltage was 4.25 V. Then, the batteries were discharged at a constant current at a rate of 0.33 C for 3 hours until the battery voltage reached 2.5 V (6th cycle).

Figure 3:
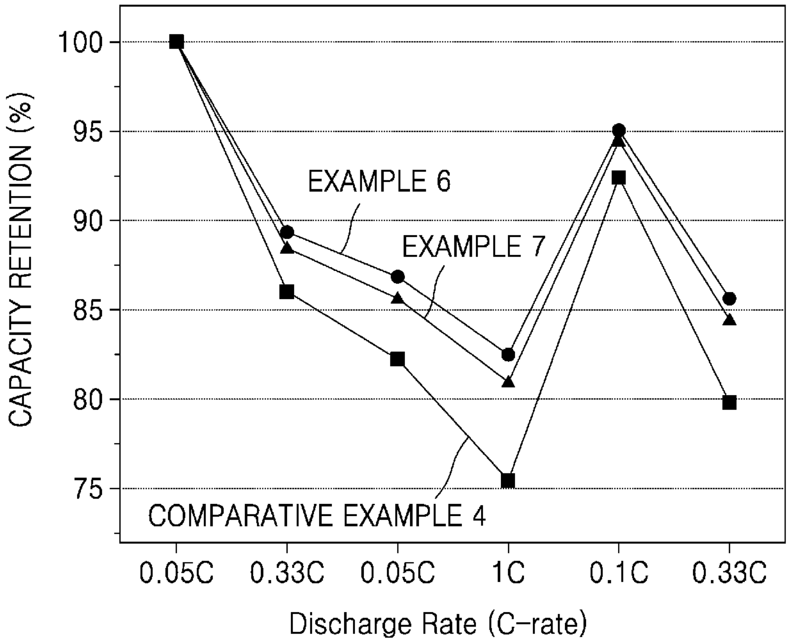
FIG. 3 is a graph of capacity retention (%) versus discharge rate (C-rate) and illustrates capacity retention of the all-solid secondary batteries of Examples 6 and 7 and Comparative Example 4.

Charge/discharge profiles of the all-solid secondary batteries of Examples 6 and 7 and Comparative Example 4 are shown in FIG. 3.

As shown in FIG. 3, unlike the all-solid secondary battery of Comparative Example 4, the all-solid secondary batteries of Examples 6 and 7 had improved C-rate characteristics.

Evaluation Example 4: Cycle Characteristics

Charge/discharge characteristics of the all-solid secondary batteries of Examples 6 and 7 using the solid electrolytes of Examples 1 and 2 and charge/discharge characteristics of the all-solid secondary battery of Comparative Example 4 using the solid electrolyte of Comparative Example 1 were evaluated by using the following charge/discharge test.

The charge/discharge cycle characteristics were evaluated by placing the all-solid secondary batteries in a constant-temperature chamber of 25° C.

The all-solid secondary batteries were charged with a constant current at a rate of 0.1 C for 10 hours until the battery voltage was 4.25 V and then discharged at a constant current at a rate of 0.05 C for 20 hours until the battery voltage reached 2.5 V (1st cycle). Subsequently, the batteries were charged with a constant current at a rate of 0.1 C for 10 hours until the battery voltage was 4.25 V and then discharged at a constant current at a rate of 0.33 C for 3 hours until the battery voltage reached 2.5 V (2nd cycle). Next, the batteries were charged with a constant current at a rate of 0.1 C for 10 hours until the battery voltage was 4.25 V. Then, the batteries were discharged at a constant current at a rate of 0.5 C for 2 hours until the battery voltage reached 2.5 V (3rd cycle). Next, the batteries were charged with a constant current at a rate of 0.1 C for 10 hours until the battery voltage was 4.25 V. Then, the batteries were discharged at a constant current at a rate of 1 C for 1 hour until the battery voltage reached 2.5 V (4th cycle). Next, the batteries were charged with a constant current at a rate of 0.1 C for 10 hours until the battery voltage was 4.25 V. Then, the batteries were discharged at a constant current at a rate of 0.1 C for 10 hours until the battery voltage reached 2.5 V (5th cycle).

Next, the batteries were charged with a constant current at a rate of 0.33 C for 3 hours until the battery voltage was 4.25 V and then discharged at a constant current at a rate of 0.33 C for 3 hours until the battery voltage reached 2.5 V.

Figure 4:
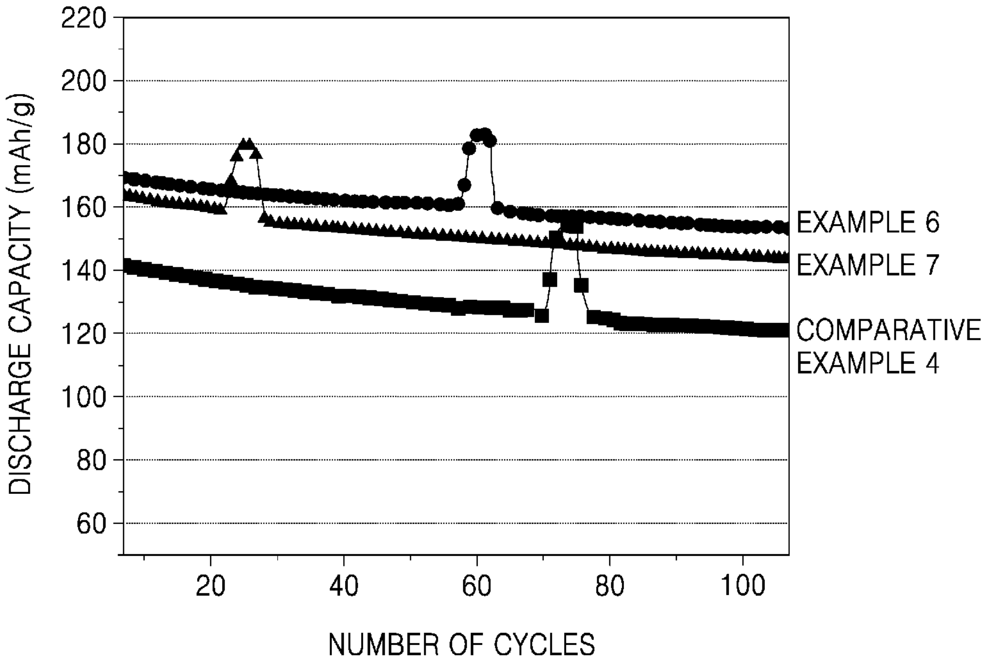
FIG. 4 is a graph of discharge capacity (milliampere hours per gram (mAh/g)) versus number of charge/discharge cycles and illustrates change in discharge capacity according to the number of charge/discharge cycles of the all-solid secondary batteries prepared in Examples 6 and 7 and Comparative Example 4.
Figure 5:
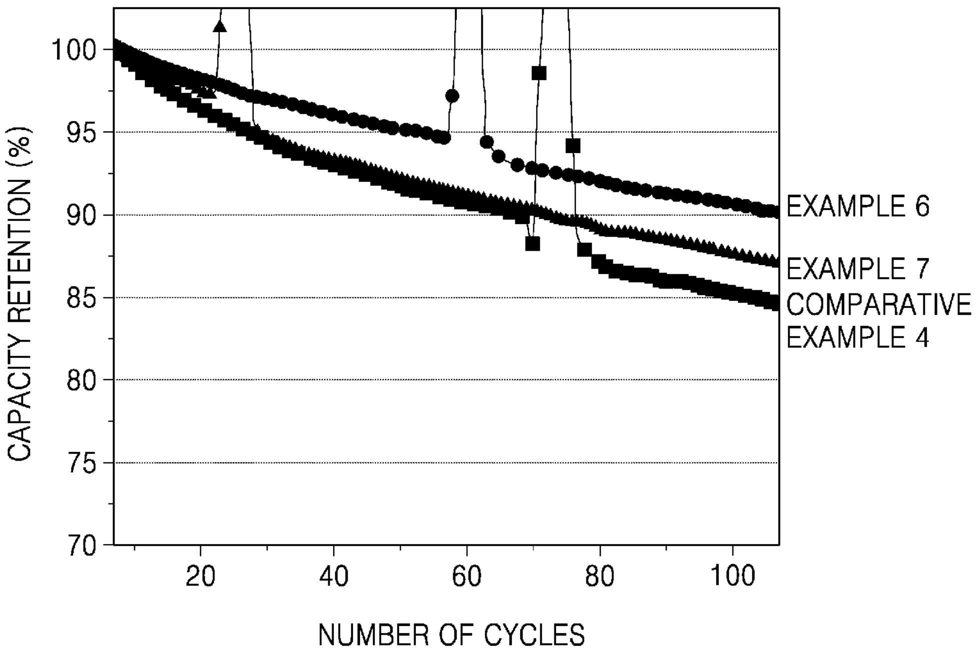
FIG. 5 is a graph of capacity retention (%) versus number of charge/discharge cycles and illustrates capacity retention of the all-solid secondary batteries prepared in Examples 6 and 7 and Comparative Example 4.

These cycles were repeated until the total number of cycles was 100, and then a capacity change and a capacity retention of each of the batteries according to the number of cycles were evaluated. The results are shown in FIGS. 4 and 5. The capacity retention was calculated as defined in Equation 1.

$$\text{Capacity retention (\%)}=(\text{Discharge capacity at each cycle}/\text{Discharge capacity at the 1st cycle})\times 100\% \quad \text{Equation 1}$$

Discharge capacity characteristics of the all-solid secondary batteries of Examples 6 and 7 were good as shown in FIG. 4 and the capacity retention of the all-solid secondary batteries of Examples 6 and 7 significantly improved as shown in FIG. 5, compared to those of the all-solid secondary battery of Comparative Example 4.

According to an aspect of an embodiment, provided is a solid electrolyte having improved rate characteristics and cycle characteristics while having excellent ion conductivity. When the solid electrolyte is used, an electrochemical cell having improved capacity retention rate and cycle characteristics may be prepared.

It should be understood that embodiments described herein should be considered in a descriptive sense only and not for purposes of limitation. Descriptions of features, aspects, or advantages within each embodiment should be considered as available for other similar features, aspects, or advantages in other embodiments. While one or more embodiments have been described with reference to the figures, it will be understood by those of ordinary skill in the art that various changes in form and details may be made therein without departing from the spirit and scope as defined by the following claims.

What is claimed is:

1. An all-solid-state secondary battery comprising:

a cathode layer;

an anode layer; and a solid electrolyte layer disposed between the cathode layer and the anode layer, wherein, at least one of the solid electrolyte layer or the cathode layer comprises a solid electrolyte, and the solid electrolyte comprises a compound represented by Formula 1-1, Formula 1-1

$$(Li_{1-a}M_a)_{7-d+x}PS_{6-d-x}(N)_x(X)d$$

wherein, in Formula 1-1,

M is at least one of Na, K, Ca, Fe, Mg, Ag, Cu, Zr, or Zn,

X is at least one of Cl, Br, F, I, or a pseudohalogen, and $0.1 \leq x \leq 0.125$, $0<a<1$, and $0<d \leq 1$, and the compound of Formula 1-1 has an argyrodite crystal structure.

2. The all-solid-state secondary battery of claim 1, wherein a capacity retention is greater than about 85% at a 100th cycle after charging to equal to or greater than 4 Volts and discharging to 2.5 Volts the electrochemical cell in a constant-temperature chamber of 25° C.

3. The all-solid-state secondary battery of claim 1, wherein X is Cl and at least one of F, Br, or I.

4. The all-solid-state secondary battery of claim 1, wherein, in Formula 1-1, $X_d$ is $(Br_{1-x1}Cl_{x1})_d$, wherein $0<x1<1$.

5. The all-solid state secondary battery of claim 1, wherein the compound is a compound represented by Formula 3:

Formula 3

$$(Li_{1-a}Na_a)_{7-d+x}PS_{6-d-x}(N)_x(X)_d.$$

6. The all-solid state secondary battery of claim 1, wherein the compound is a compound represented by Formula 4:

Formula 4

$$(Li_{1-a}K_a)_{7-d+x}PS_{6-d-x}(N)_x(X)_d.$$

7. The all-solid state secondary battery of claim 1, wherein the compound is a compound represented by Formula 5:

Formula 5

$$(Li_{1-a}M_a)_{7-d+x}PS_{6-d-x}(N)_x(Br_{1-x1}(Cl)_{x1})_d.$$

8. The all-solid-state secondary battery of claim 1, wherein an ion conductivity of the solid electrolyte at 25° C. is equal to or greater than about 1 millisiemen per centimeter.

9. The all-solid-state secondary battery of claim 1, wherein a thickness of the solid electrolyte is about 10 micrometers to about 200 micrometers.

10. The all-solid-state secondary battery of claim 1, wherein the compound represented by Formula 1-1 is $Li_6Na_{0.125}PS_{4.875}N_{0.125}Cl$, $Li_6Na_{0.25}PS_{4.75}N_{0.25}Cl$, $Li_6K_{0.125}PS_{4.875}N_{0.125}Cl$, $Li_6K_{0.25}PS_{4.75}N_{0.25}Cl$, $Li_6Na_{0.125}PS_{4.875}N_{0.125}Cl_{0.5}Br_{0.5}$, $Li_6Na_{0.25}PS_{4.75}N_{0.25}Cl_{0.5}Br_{0.5}$, $Li_6K_{0.125}PS_{4.875}N_{0.125}Cl_{0.5}Br_{0.5}$, $Li_6K_{0.25}PS_{4.75}N_{0.25}Cl_{0.5}Br_{0.5}$, $Li_6Na_{0.125}PS_{4.875}N_{0.125}Cl_{0.16}Br_{0.84}$, $Li_6Na_{0.25}PS_{4.75}N_{0.25}Cl_{0.16}Br_{0.84}$, $Li_6K_{0.125}PS_{4.875}N_{0.125}Cl_{0.16}Br_{0.84}$, $Li_6K_{0.25}PS_{4.75}N_{0.25}Cl_{0.16}Br_{0.84}$, $Li_6Na_{0.125}PS_{4.875}N_{0.125}Br$, $Li_6Na_{0.25}PS_{4.75}N_{0.25}Br$, $Li_6K_{0.125}PS_{4.875}N_{0.125}Br$, $Li_6K_{0.25}PS_{4.75}N_{0.25}Br$, $Li_{6.115}Cu_{0.01}PS_{4.88}N_{0.125}Cl$, $Li_{6.115}Mg_{0.01}PS_{4.88}N_{0.125}Cl$, $Li_{6.115}Ca_{0.01}PS_{4.88}N_{0.125}Cl$, $Li_{6.115}Fe_{0.01}PS_{4.88}N_{0.125}Cl$, $Li_{6.115}Zn_{0.01}PS_{4.88}N_{0.125}Cl$, $Li_{5.9}K_{0.1}Na_{0.125}PS_{4.875}N_{0.125}Cl$, or a combination thereof.

11. The all-solid-state secondary battery of claim 1, wherein the cathode layer comprises a cathode active material.

12. The all-solid-state secondary battery of claim 11, wherein the cathode active material is at least one of a lithium transition metal oxide having a layered crystal structure, a lithium transition metal oxide having an olivine crystal structure, or a lithium transition metal oxide having a spinel crystal structure.

13. The all-solid-state secondary battery of claim 11, wherein the cathode layer further comprises a conducting agent.

14. The all-solid-state secondary battery of claim 13, wherein an amount of the solid electrolyte in the cathode layer is about 2 parts by weight to about 70 parts by weight, based on 100 parts by weight of the cathode active material.

15. The all-solid-state secondary battery of claim 1, wherein the anode layer comprises an anode current collector, and a first anode active material layer disposed on the anode current collector, wherein the first anode active material layer comprises a first anode active material.

16. The all-solid-state secondary battery of claim 15, wherein the first anode active material comprises at least one of a carbonaceous anode active material, a metal, or a metalloid.

17. The all-solid-state secondary battery of claim 15, wherein the first anode active material comprises a carbonaceous anode active material and the carbonaceous anode active material is at least one of an amorphous carbon or a crystalline carbon.

18. The all-solid-state secondary battery of claim 15, wherein the first anode active material comprises a metal or a metalloid, the metal or metalloid including at least one of Au, Pt, Pd, Si, Ag, Al, Bi, Sn, or Zn.

19. The all-solid-state secondary battery of claim 15 further comprising a second anode active material layer disposed between the anode current collector and the first anode active material layer, or between the solid electrolyte layer and the first anode active material layer.

20. The all-solid-state secondary battery of claim 19, wherein the second anode active material layer is a metal in the form of a layer comprising at least one of lithium metal or a lithium alloy.

* * * * *